United States Patent
Nishi et al.

(10) Patent No.: US 11,145,091 B2
(45) Date of Patent: Oct. 12, 2021

(54) MAKEUP SIMULATION DEVICE, METHOD, AND NON-TRANSITORY RECORDING MEDIUM

(71) Applicant: Panasonic Intellectual Property Management Co., Ltd., Osaka (JP)

(72) Inventors: Chie Nishi, Kanagawa (JP); Sachiko Takeshita, Tokyo (JP); Rieko Asai, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/524,214

(22) Filed: Jul. 29, 2019

(65) Prior Publication Data
US 2019/0347832 A1  Nov. 14, 2019

Related U.S. Application Data

(63) Continuation of application No. PCT/JP2018/003943, filed on Feb. 6, 2018.

(30) Foreign Application Priority Data

Feb. 28, 2017  (JP) .............................. JP2017-037296

(51) Int. Cl.
*G06T 11/00* (2006.01)
*G06T 7/33* (2017.01)
(Continued)

(52) U.S. Cl.
CPC ............ *G06T 11/00* (2013.01); *A45D 44/005* (2013.01); *G06K 9/00597* (2013.01); *G06T 7/33* (2017.01); *G06T 2207/30041* (2013.01)

(58) Field of Classification Search
None
See application file for complete search history.

(56) References Cited

U.S. PATENT DOCUMENTS

| | | | | |
|---|---|---|---|---|
| 2004/0027618 A1* | 2/2004 | Nakamura | ............ | G06T 7/0004 358/3.26 |
| 2009/0067755 A1* | 3/2009 | Khamene | ............ | G06K 9/6206 382/300 |

(Continued)

FOREIGN PATENT DOCUMENTS

| | | |
|---|---|---|
| JP | 2015-176181 | 10/2015 |
| WO | 2015/029372 | 3/2015 |

OTHER PUBLICATIONS

Fashionlady, "Have You Known The Types of Monolids?"; posted 12, 2016, https://www.fashionlady.in/have-you-known-the-types-of-monolids/38650 (Year: 2016).*

(Continued)

*Primary Examiner* — Sarah Le
(74) *Attorney, Agent, or Firm* — Greenblum & Bernstein, P.L.C.

(57) ABSTRACT

A makeup simulation device that superimposes a makeup part onto a face image obtained by photographing a face of a person and causes the face image to be displayed on a display device includes: a face image acquisition unit that acquires a first face image and a second face image that are different from each other in appearance of the face due to movement of a specific face part; a makeup part drawing unit that draws a makeup part on the specific face part in the first face image; a makeup part deforming unit that deforms the makeup part drawn on the specific face part of the first face image in accordance with movement of the specific face part; and a makeup part superimposing unit that superimposes the deformed makeup part onto the second face image.

14 Claims, 19 Drawing Sheets

(51) Int. Cl.
*A45D 44/00* (2006.01)
*G06K 9/00* (2006.01)

(56) References Cited

U.S. PATENT DOCUMENTS

| | | | |
|---|---|---|---|
| 2011/0213203 A1* | 9/2011 | Minai | A61B 1/041 |
| | | | 600/109 |
| 2015/0254501 A1 | 9/2015 | Yamanashi et al. | |
| 2015/0262403 A1 | 9/2015 | Yamanashi | |
| 2015/0304554 A1* | 10/2015 | Matsubara | H04N 1/00289 |
| | | | 348/239 |
| 2016/0357578 A1* | 12/2016 | Kim | A45D 44/005 |
| 2017/0024907 A1* | 1/2017 | Bermano | G06T 17/20 |

OTHER PUBLICATIONS

International Search Report of PCT application No. PCT/JP2018/003943 dated Apr. 10, 2018.

* cited by examiner

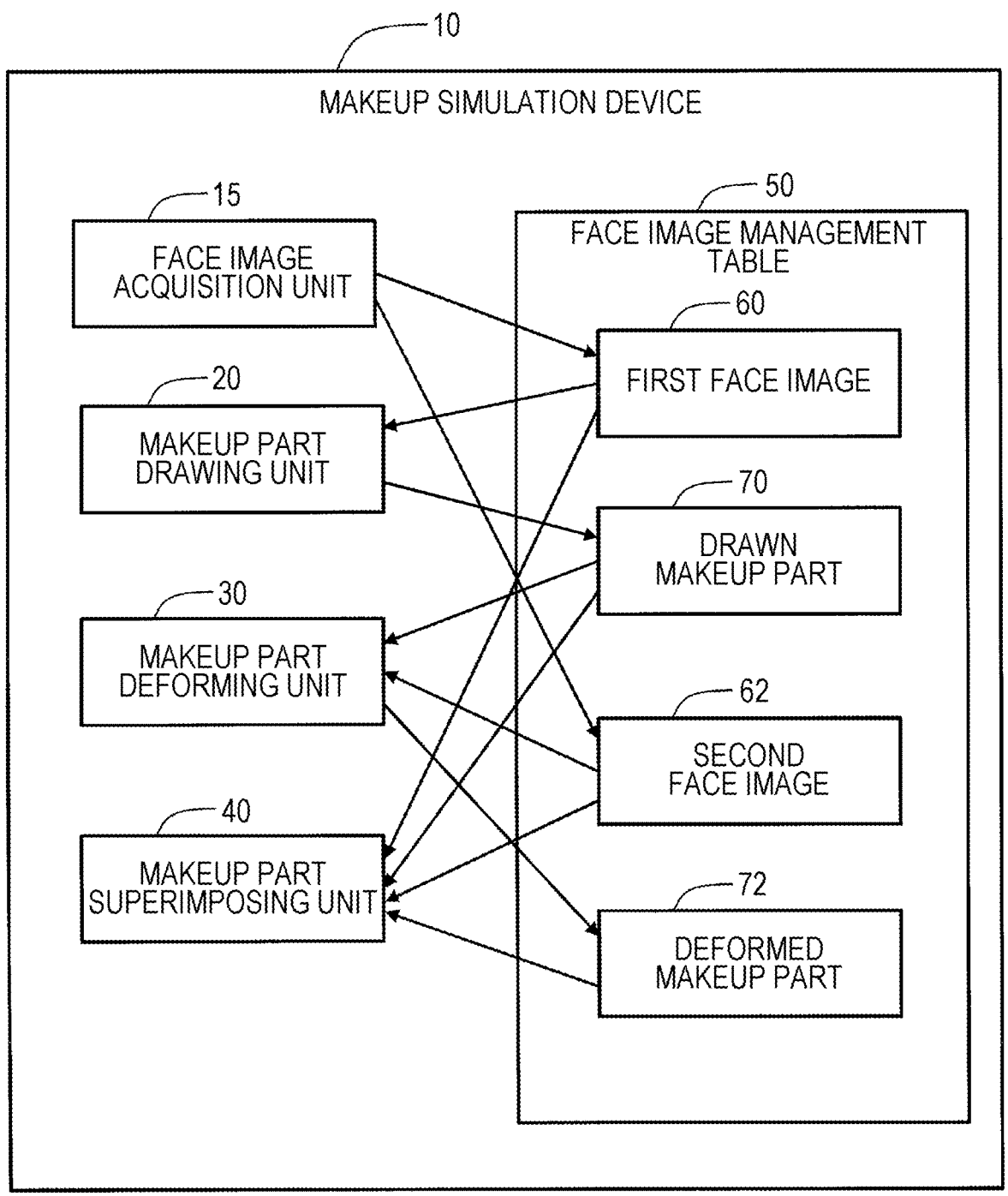

FIG. 4
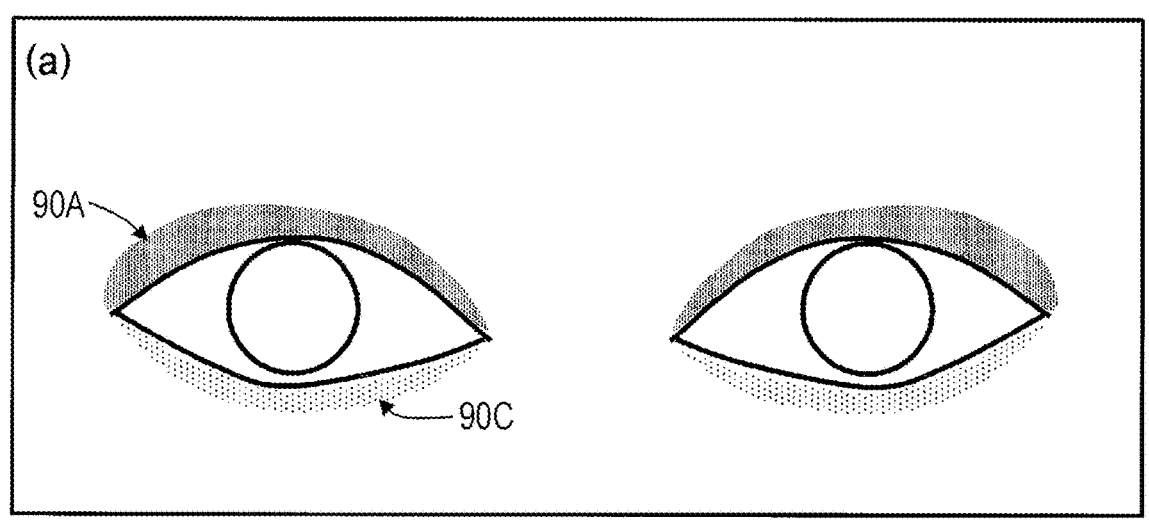
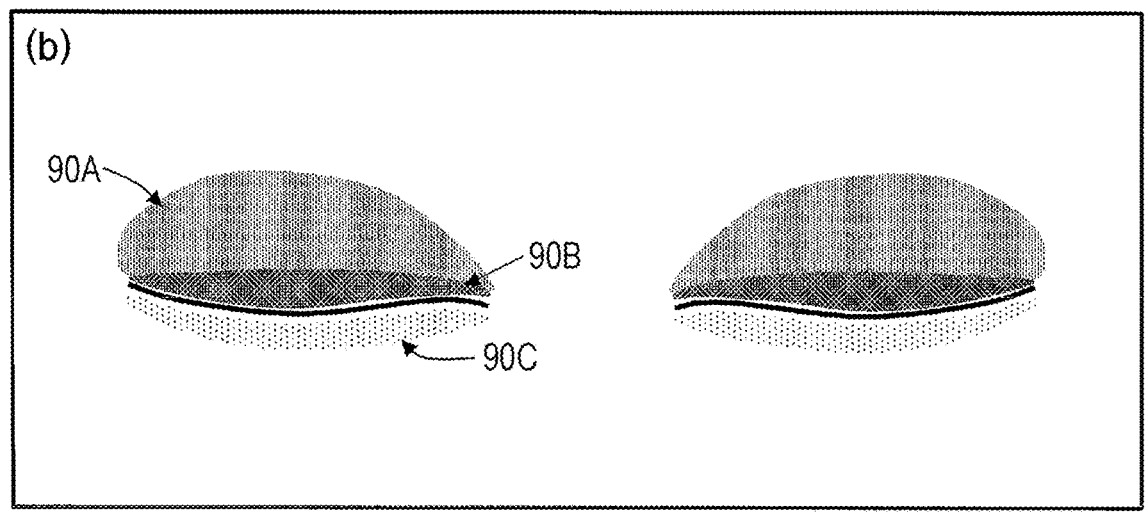

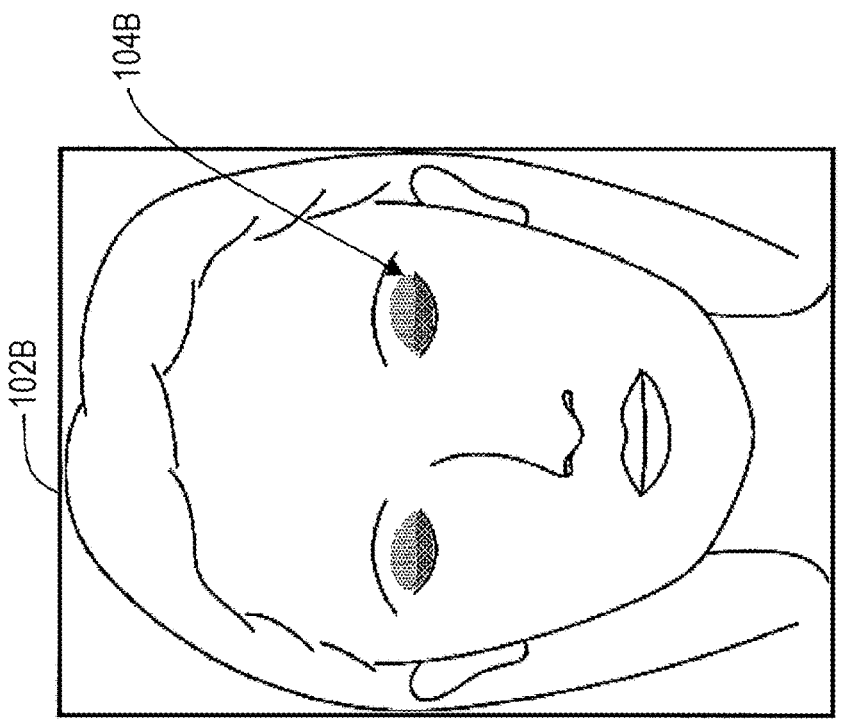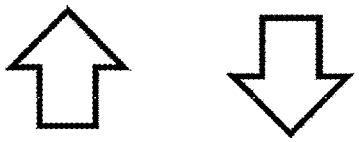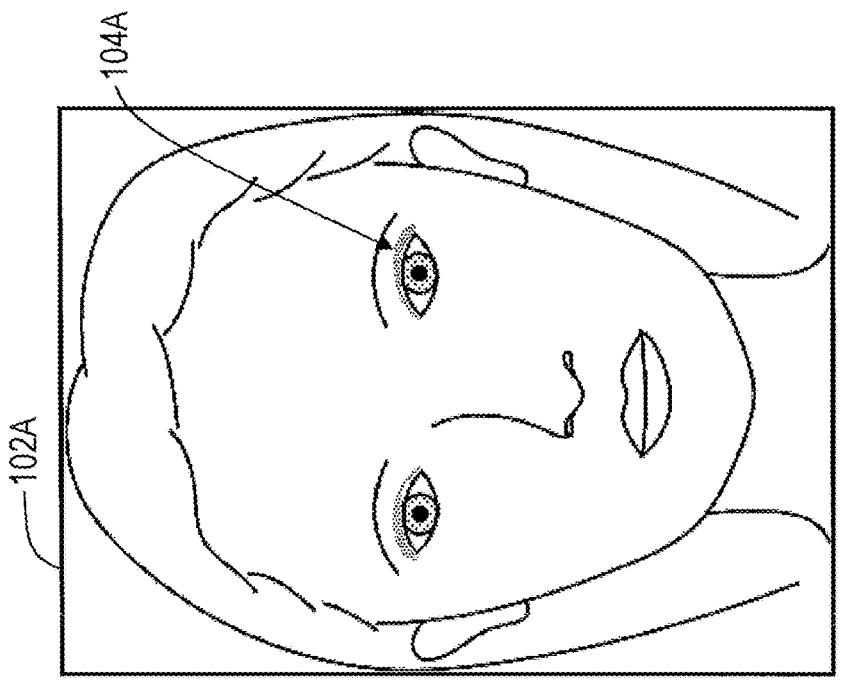
FIG. 7

FIG. 8

| MAKEUP USER ID 202 | EYE-OPENED IMAGE 204 | EYE-CLOSED IMAGE 206 | LEFT-EYE-OPENED MAKEUP PART 208 | RIGHT-EYE-OPENED MAKEUP PART 210 | LEFT-EYE-CLOSED MAKEUP PART 212 | RIGHT-EYE-CLOSED MAKEUP PART 214 | SINGLE-EDGED EYELID FLAG 216 |
|---|---|---|---|---|---|---|---|
| U001 | Oface1 | Cface1 | OL_Ueyelid1<br>OL_eyeline1<br>OL_Deyelid1 | OR_Ueyelid1<br>OR_eyeline1<br>OR_Deyelid1 | CL_Ueyelid1<br>CL_eyeline1<br>CL_Deyelid1 | CR_Ueyelid1<br>CR_eyeline1<br>CR_Deyelid1 | OFF |
| U002 | Oface2 | Cface2 | OL_Ueyelid2<br>OL_eyeline2<br>OL_Deyelid2 | OR_Ueyelid2<br>OR_eyeline2<br>OR_Deyelid2 | CL_Ueyelid2<br>CL_eyeline2<br>CL_Deyelid2 | CR_Ueyelid2<br>CR_eyeline2<br>CR_Deyelid2 | ON |
| ⋮ | ⋮ | ⋮ | ⋮ | ⋮ | ⋮ | ⋮ | ⋮ |

50

MAKEUP SIMULATION DEVICE, METHOD, AND NON-TRANSITORY RECORDING MEDIUM

BACKGROUND

1. Technical Field

The present disclosure relates to a makeup simulation device, a method, and a non-transitory recording medium.

2. Description of the Related Art

It is usual to do makeup while referring to how another person does makeup (hereinafter simply referred to as "makeup"). For example, it is usual to do makeup based on a photograph of a face of a model on a fashion magazine. It is, however, difficult to accurately imitate makeup done on another person since there are differences in layout, shapes, and sizes of face parts among individuals.

In view of this, there are techniques for displaying a simulation image of a made-up face by using a user's face (see, for example, Japanese Unexamined Patent Application Publication No. 2015-176181). According to the technique (hereinafter referred to as a "conventional art") described in Japanese Unexamined Patent Application Publication No. 2015-176181, a simulation image of a made-up face is generated by superimposing an image of cosmetics applied to a face onto a still image of a user's face. According to such a conventional art, the user can do makeup so that the user's makeup becomes similar to the simulation image.

SUMMARY

However, actually, how makeup appears changes as a result of movement of a face part. For example, how eye makeup appears in a state where eyes are closed and how eye makeup appears in a state where eyes are opened are markedly different. Conventional makeup simulation cannot address such a problem.

One non-limiting and exemplary embodiment provides a makeup simulation device, a method, and a program that can simulate makeup in a part where how makeup appears changes as a result of movement of a face part so that the makeup can appear as a natural makeup irrespective of the movement.

In one general aspect, the techniques disclosed here feature a makeup simulation device that superimposes a makeup part onto a face image obtained by photographing a face of a person and causes the face image to be displayed on a display device, the makeup simulation device including: a face image acquisition unit that acquires a first face image and a second face image that are different from each other in appearance of the face due to movement of a specific face part; a makeup part drawing unit that draws a makeup part on the specific face part in the first face image; a makeup part deforming unit that deforms the makeup part drawn on the specific face part of the first face image in accordance with movement of the specific face part; and a makeup part superimposing unit that superimposes the deformed makeup part onto the second face image.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a block diagram illustrating a functional configuration of a makeup simulation device according to the present exemplary embodiment;

FIG. 4 is a schematic view concerning opening and closing of eyes having single-edged eyelids;

FIG. 7 is a schematic view concerning switching between an eye-opened image and an eye-closed image;

FIG. 8 is a table illustrating a configuration of a face image management table;

DETAILED DESCRIPTION

An exemplary embodiment is described below with reference to the drawings.

In the exemplary embodiment below, constituent elements (including element steps and the like) are not necessarily essential unless otherwise specified or unless the constituent elements are clearly considered as being essential in principle.

Configuration of Makeup Simulation Device

FIG. 1 is a block diagram illustrating a functional configuration of a makeup simulation device 10.

The makeup simulation device 10 is a device that electronically applies makeup onto an image (hereinafter referred to as a "face image") of a face of a user to be made up (hereinafter referred to as a "makeup target user"). The makeup simulation device 10 superimposes a makeup part onto a face image showing a human face and causes an image thus obtained to be displayed on a display device.

Figure 17:
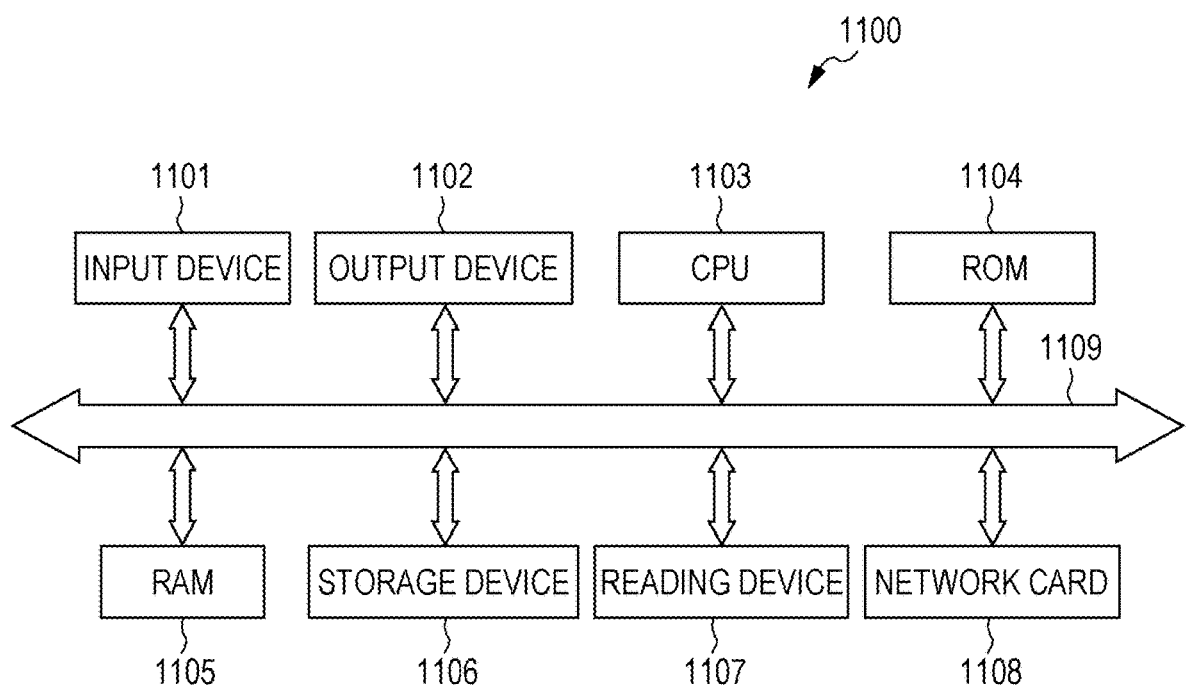
FIG. 17 illustrates a hardware configuration of a computer.

The makeup simulation device 10 has, as functions, a face image acquisition unit 15, a makeup part drawing unit 20, a makeup part deforming unit 30, and a makeup part superimposing unit 40. These functions are realized by operation of hardware such as a CPU of the makeup simulation device 10 as illustrated in FIG. 17 that will be described later.

The face image acquisition unit 15 acquires a first face image 60 and a second face image 62 that are different in appearance of a face of a makeup target user due to movement of a specific face part.

The makeup part drawing unit 20 draws a makeup part on the first face image 60 of the makeup target user. Hereinafter, the makeup part thus drawn is referred to as a "drawn makeup part". A drawn makeup part 70 is data of makeup drawn on a face image and is, for example, raster data or vector data. Hereinafter, a user who draws a makeup part on the face image of the makeup target user is referred to as a "makeup execution user". The makeup execution user and the makeup target user may be the same as each other or may be different from each other.

The makeup part deforming unit 30 deforms a makeup part drawn on a specific face part of the first face image 60 in accordance with movement of the specific face part. Hereinafter, the makeup part thus deformed is referred to as a "deformed makeup part".

The makeup part superimposing unit 40 superimposes a deformed makeup part 72 onto the second face image 62. The second face image 62 and the deformed makeup part 72 superimposed onto the second face image 62 are displayed on a display device.

This allows the makeup execution user to easily check how the makeup drawn on the first face image 60 of the makeup target user appears on the second face image 62 of the same makeup target user.

The first face image 60, the second face image 62, the drawn makeup part 70, and the deformed makeup part 72 are managed for each makeup target user in association with one another in a face image management table 50. Details of the face image management table 50 will be described later (see FIG. 8).

In the present exemplary embodiment, a case where a face part that moves is eyes is described. However, the face part may be, for example, another face part that moves, such as eyebrows or lips.

In the present exemplary embodiment, a case where a makeup part is an eye makeup part for makeup of eyes is described. However, the makeup part is not limited to the eye makeup part and may be a part for makeup of eyebrows, lips, or cheeks.

In the present exemplary embodiment, in a case where the first face image 60 is a face image showing closed eyes, the second face image 62 is a face image showing opened eyes, and in a case where the first face image 60 is a face image showing opened eyes, the second face image 62 is a face image showing closed eyes. Hereinafter, a face image showing closed eyes is referred to as an "eye-closed image", and a face image showing opened eyes is referred to as an "eye-opened image".

This allows the makeup execution user to easily check how eye makeup drawn on the eye-closed image appears on the eye-opened image and how eye makeup drawn on the eye-opened image appears on the eye-closed image.

The present exemplary embodiment is described in detail below.

FIGS. 2A through 2D are schematic views concerning an eye makeup part.

The makeup part superimposing unit 40 superimposes an eye makeup part on the basis of feature points of eyes on a face image.

Figure 2A:
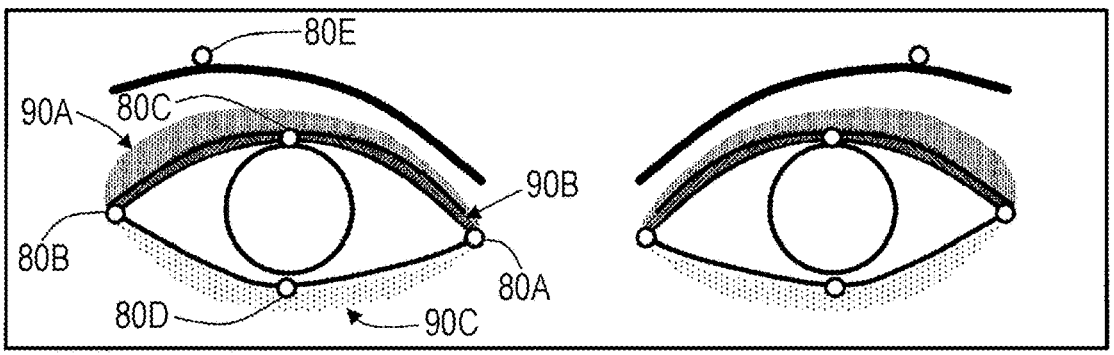
FIGS. 2A through 2D are schematic views concerning an eye makeup part.

As the features of the eyes, an eye inner corner point 80A, an eye outer corner point 80B, an iris upper point 80C, an iris lower point 80D, and an eyebrow arch peak point 80E are set as illustrated in FIG. 2A. Furthermore, a middle point may be set between feature points of the eyes.

The eye makeup part includes, for example, an upper eyelid makeup part 90A, an eye upper edge makeup part 90B, and a lower eyelid makeup part 90C as illustrated in FIG. 2A.

Figure 2B:
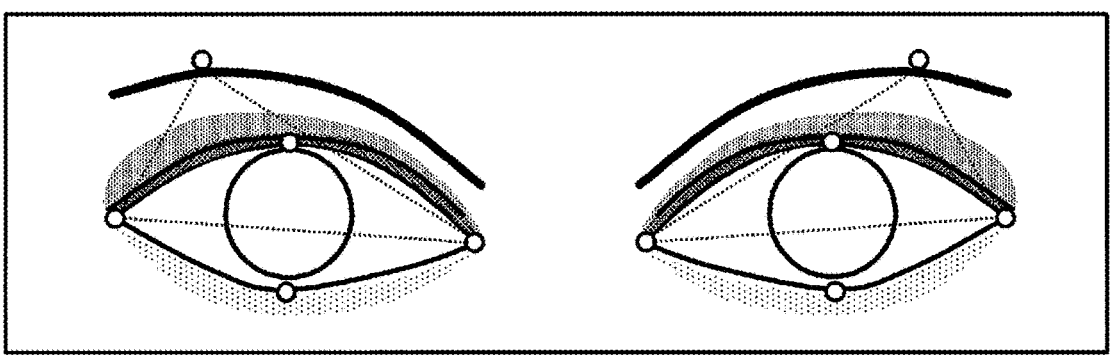

The upper eyelid makeup part 90A is, for example, synthesized on the face image on the basis of the eye inner corner point 80A, the eye outer corner point 80B, and the eyebrow arch peak point 80E as illustrated in FIG. 2B.

Figure 2C:
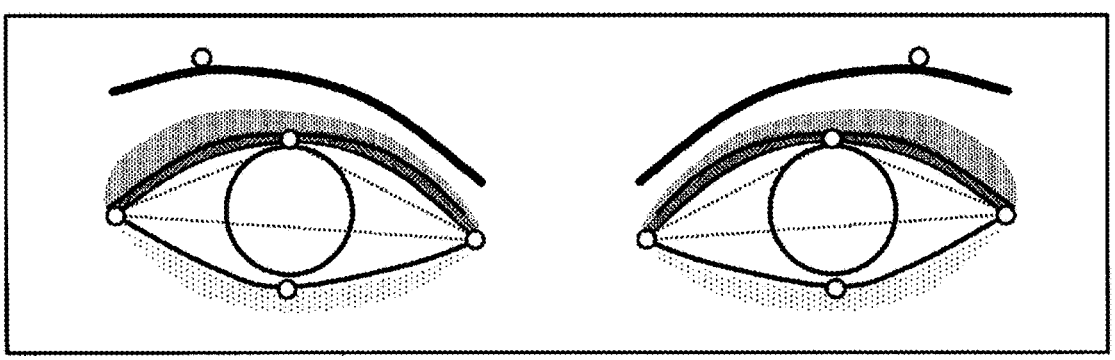

The eye upper edge makeup part 90B is, for example, synthesized on the face image on the basis of the eye inner corner point 80A, the eye outer corner point 80B, and the iris upper point 80C as illustrated in FIG. 2C.

Figure 2D:
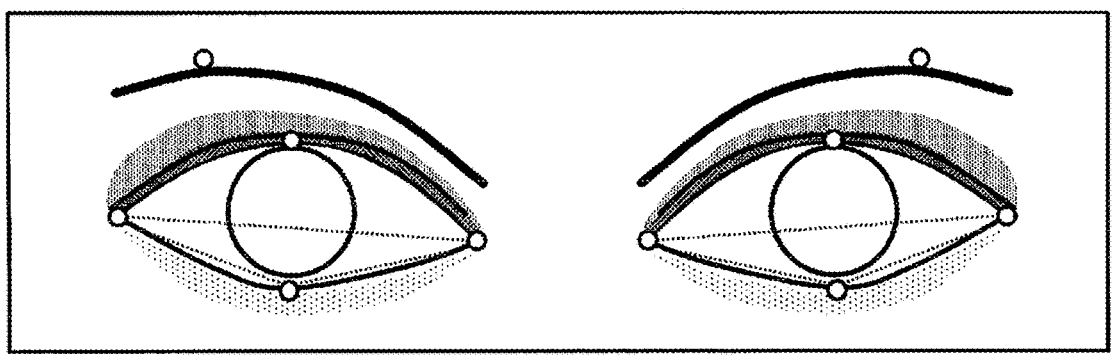

The lower eyelid makeup part 90C is, for example, synthesized on the face image on the basis of the eye inner corner point 80A, the eye outer corner point 80B, and the iris lower point 80D as illustrated in FIG. 2D.

Figure 3:
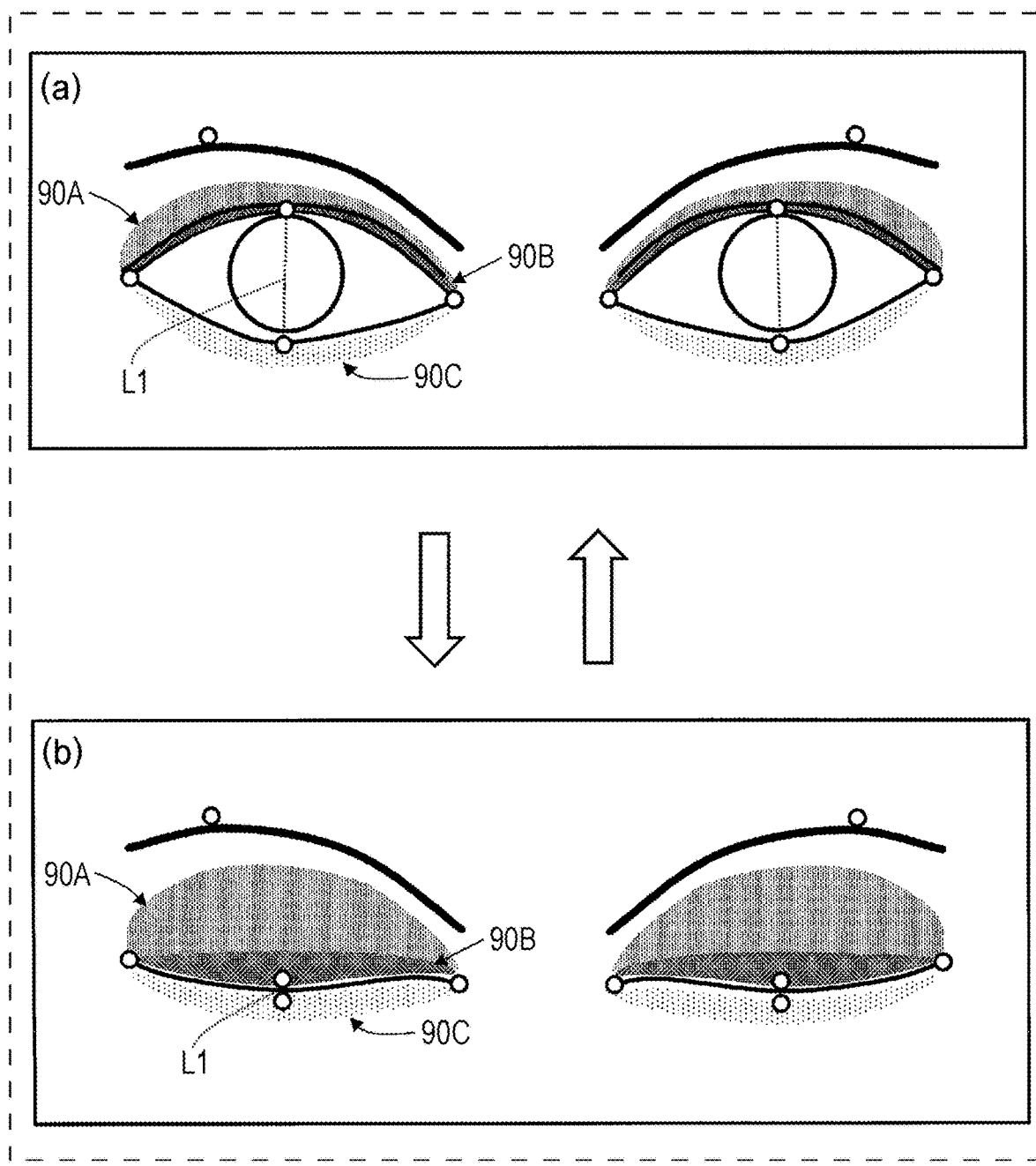
FIG. 3 is a schematic view concerning opening and closing of eyes having double-edged eyelids.

FIGS. 3 and 4 are schematic views concerning opening and closing of eyes.

FIG. 3 is a schematic view illustrating a case of double-edged eyelids, and FIG. 4 is a schematic view illustrating a case of single-edged eyelids.

The makeup execution user draws an eye makeup part on an eye-opened image in some cases as illustrated in FIG. 3(a) and draws an eye makeup part on an eye-closed image in other cases as illustrated in FIG. 3(b).

In a case where an eye makeup part like the one illustrated in FIG. 3(a) is drawn on an eye-opened image, the makeup part deforming unit 30 generates an eye makeup part for an eye-closed image like the one illustrated in FIG. 3(b) by deforming the eye makeup part.

In a case where an eye makeup part like the one illustrated in FIG. 3(b) is drawn on an eye-closed image, the makeup part deforming unit 30 generates an eye makeup part for an eye-opened image like the one illustrated in FIG. 3(a) by deforming the eye makeup part.

Whether or not a face image is an eye-opened image or an eye-closed image is determined on the basis of a distance L1 between the iris upper point 80C and the iris lower point 80D. In a case where the distance L1 is less than a predetermined value, it is determined that the face image is an eye-closed image, and in a case where the distance L1 is not less than the predetermined value, it is determined that the face image is an eye-opened image.

The makeup part deforming unit 30 deforms the upper eyelid makeup part 90A and the eye upper edge makeup part 90B and does not deform the lower eyelid makeup part 90C among the parts included in the eye makeup part. This is because lower eyelid makeup applied to an actual face is not hardly deformed by opening and closing of eyes.

In a case of single-edged eyelids (including partially creased eyelids; the same applies hereafter), eye upper edge makeup applied to an actual face with closed eyes is typically hidden when the eyes are opened.

Accordingly, in a case where the deformed makeup part 72 is superimposed on an eye-opened image showing single-edged eyelids, the makeup part superimposing unit 40 does not deform the eye upper edge makeup part 90B on an eye-closed image as illustrated in FIG. 4(*b*). This achieves more real makeup simulation for a makeup target user having single-edged eyelids.

Whether or not eyelids are double-edged eyelids or single-edged eyelids is determined on the basis of whether or not there is a double-edged-eyelid line above an eye edge in a face image. In a case where a double-edged-eyelid line is detected, it is determined that the eyelids are double-edged eyelids, and in a case where a double-edged-eyelid line is not detected, it is determined that the eyelids are single-edged eyelids. Note that a double-edged-eyelid line may be detected by using an existing image analysis means.

In a case where a part of the deformed makeup part 72 overlaps an eye region, the makeup part superimposing unit 40 hides the part of the deformed makeup part 72. The eye region is defined as a range surrounded by the eye inner corner point 80A, the eye outer corner point 80B, the iris upper point 80C, and the iris lower point 80D. This makes it possible to prevent the deformed makeup part 72 from unnaturally overlapping an eye region.

Figure 5A:
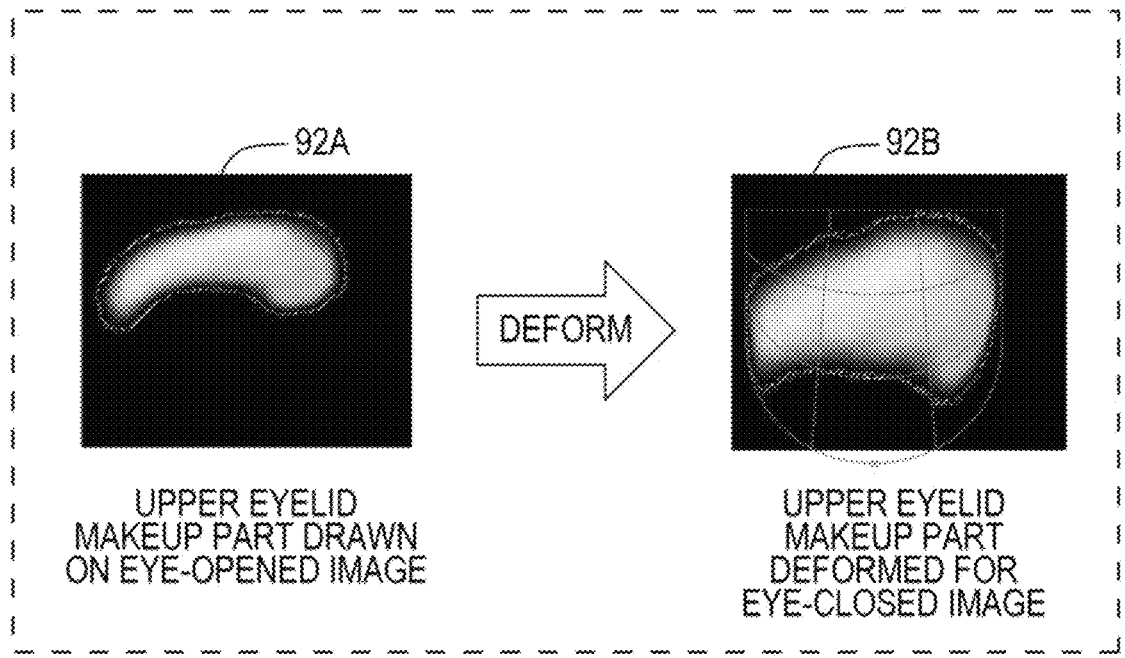
FIG. 5A is a schematic view concerning a method for deforming an upper eyelid makeup part.
Figure 5B:
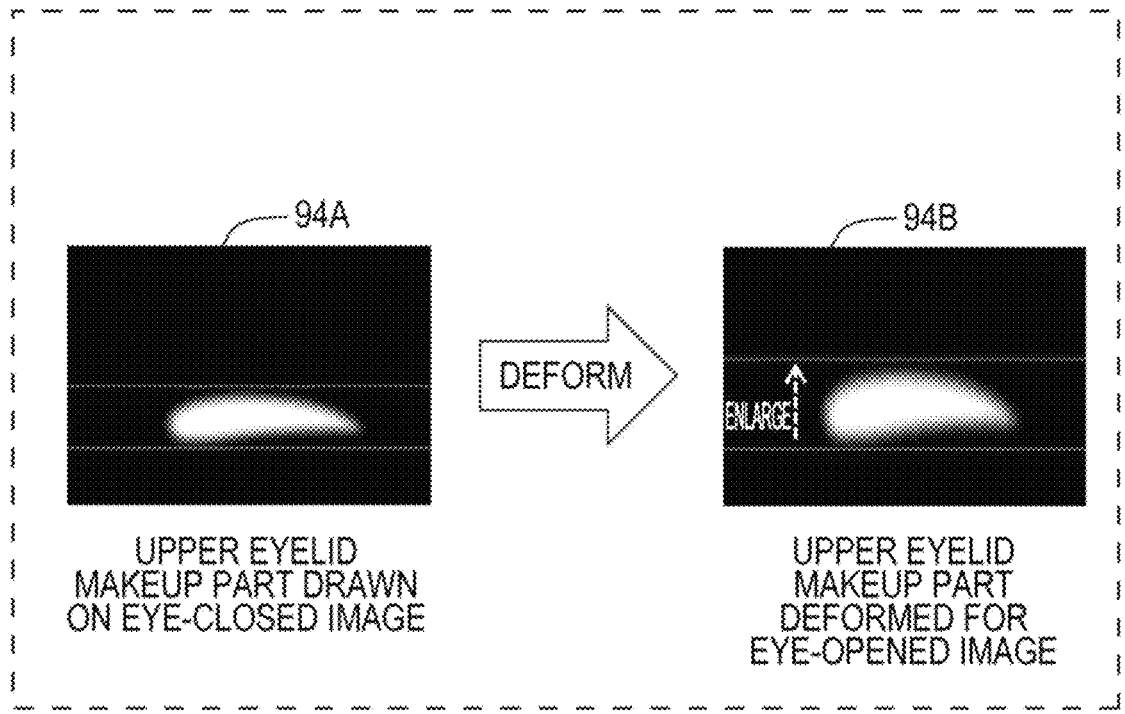
FIG. 5B is a schematic view concerning a method for deforming an upper eyelid makeup part.

FIGS. 5A and 5B are schematic views illustrating an example concerning a method for deforming the upper eyelid makeup part 90A.

As illustrated in FIG. 5A, the makeup part deforming unit 30 generates an upper eyelid makeup part 92B for an eye-closed image by stretching (warping) a lower chord part of an upper eyelid makeup part 92A drawn on an eye-opened image downward.

As illustrated in FIG. 5B, the makeup part deforming unit 30 generates an upper eyelid makeup part 94B for an eye-opened image by stretching (warping) a lower chord part of an upper eyelid makeup part 94A drawn on an eye-closed image upward.

Alternatively, the makeup part deforming unit 30 generates the upper eyelid makeup part 94B for an eye-opened image by enlarging a vertical component of the upper eyelid makeup part 94A drawn on the eye-closed image upward on the whole.

Alternatively, the makeup part deforming unit 30 generates the upper eyelid makeup part 90A for an eye-opened image by superimposing the upper eyelid makeup part 94A drawn on the eye-closed image onto the eye-opened image and then removing a part that overlaps a region of an opened eye from the drawn upper eyelid makeup part 94A.

The makeup part deforming unit 30 generates a deformed eye upper edge makeup part from a drawn eye upper edge makeup part by a method similar to the upper eyelid makeup part.

Figure 6:
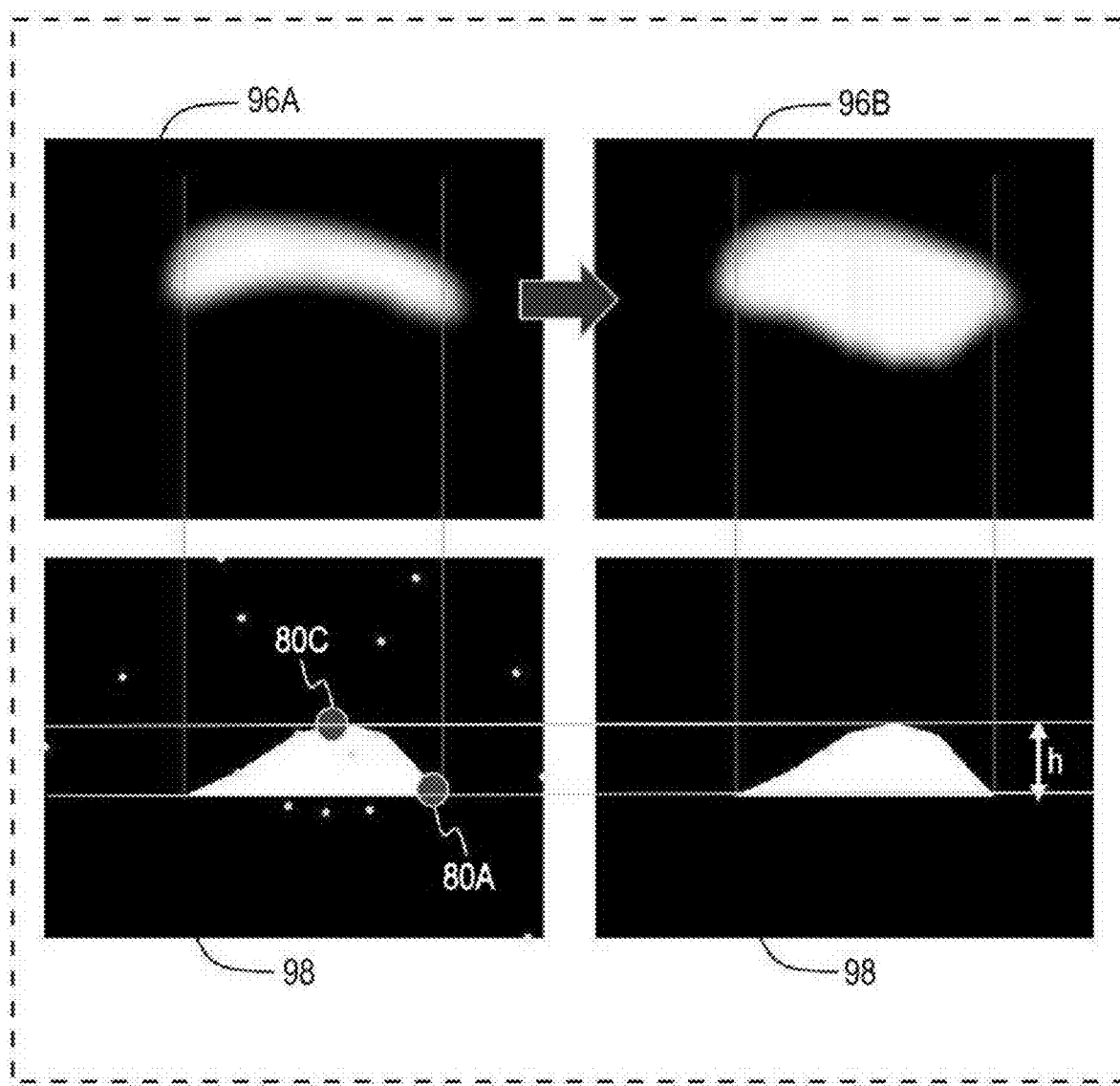
FIG. 6 is a schematic view illustrating a modification concerning a method for deforming an upper eyelid makeup part.

FIG. 6 is a schematic view illustrating a modification concerning a method for deforming the upper eyelid makeup part 90A.

The makeup part deforming unit 30 may generate an upper eyelid makeup part 96B for an eye-closed image by deforming an upper eyelid makeup part 96A drawn on an eye-opened image as follows.

(A1) The makeup part deforming unit 30 specifies the eye inner corner point 80A and the iris upper point 80C from an analysis result 98 concerning feature points of eyes in an eye-opened image and calculates a region that is deformed within an eye region as a result of switching from an eye-opened state to an eye-closed state.

(A2) Next, the makeup part deforming unit 30 generates the upper eyelid makeup part 96B for an eye-closed image by moving, for each pixel column, a lower drawn part of the upper eyelid makeup part 96A drawn on the eye-opened image downward by a height of the pixel column of the deformed region calculated in A1. An upper drawn part is left as it is. That is, a drawn range is expanded downward in accordance with a height of each pixel column of the deformed region between the eye-opened image and the eye-closed image.

In a case where an upper eyelid makeup part 98A for an eye-opened image is generated from an upper eyelid makeup part 98B drawn on an eye-closed image, the makeup part deforming unit 30 executes A3 instead of A2.

(A3) The makeup part deforming unit 30 generates the upper eyelid makeup part 98A for an eye-opened image by moving, for each pixel column, a lower drawn part of the upper eyelid makeup part 98B drawn on the eye-closed image upward by a height of the pixel column calculated in A1. An upper drawn part is left as it is. That is, a drawn range is reduced upward in accordance with a height of each pixel column of the deformed region between the eye-closed image and the eye-opened image.

FIG. 7 is a schematic view illustrating an example concerning switching between an eye-opened image and an eye-closed image.

In a case where the makeup execution user draws a drawn makeup part 104A on an eye-opened image as illustrated in an image 102A and switches the eye-opened image to an eye-closed image, the makeup part superimposing unit 40 superimposes a deformed makeup part 104B obtained by deforming the drawn makeup part 104A onto the eye-closed image as illustrated in an image 1026.

In a case where the makeup execution user draws the drawn makeup part 1046 on the eye-closed image as illustrated in the image 1026 and switches the eye-closed image to the eye-opened image, the makeup part superimposing unit 40 superimposes the deformed makeup part 104A obtained by deforming the drawn makeup part 1046 onto the eye-opened image as illustrated in the image 102A.

In this way, the makeup execution user can easily know how appearance of makeup drawn on a face changes as a result of opening and closing of eyes by using the makeup simulation device 10.

Configuration of Face Image Management Table

FIG. 8 is a table diagram illustrating a configuration of the face image management table 50.

The face image management table 50 is a table for managing a face image of a makeup target user, the drawn makeup part 70 drawn on the face image, and the deformed makeup part 72 obtained by deforming the drawn makeup part 70 in association with one another.

For example, the face image management table 50 has, as data items, a made-up user ID 202, an eye-opened image 204, an eye-closed image 206, an left-eye-opened makeup part 208, an right-eye-opened makeup part 210, a left-eye-closed makeup part 212, a right-eye-closed makeup part 214, and a single-edged eyelid flag 216.

In the made-up user ID 202, identification information of a makeup target user is stored.

In the eye-opened image 204, data of a face image in which eyes of the makeup target user represented by the made-up user ID 202 are opened is stored. In the eye-closed image 206, data of a face image in which the eyes of the makeup target user represented by the made-up user ID 202 are closed is stored.

In the left-eye-opened makeup part 208, data of an eye makeup part for a left eye of the eye-opened image 204 is stored. In the right-eye-opened makeup part 210, data of an eye makeup part for a right eye of the eye-opened image 204 is stored.

In the left-eye-closed makeup part 212, data of an eye makeup part for a left eye of the eye-closed image 206 is stored. In the right-eye-closed makeup part 214, data of an eye makeup part for a right eye of the eye-closed image 206 is stored.

In the single-edged eyelid flag 216, identification information indicative of whether or not the makeup target user represented by the made-up user ID 202 has single-edged eyelids is stored. For example, "ON" is stored in a case where the makeup target user has single-edged eyelids or partially creased eyelids, and "OFF" is stored in a case where the makeup target user has double-edged eyelids or triple-edged eyelids.

A reason why a makeup part for a left eye and a makeup part for a right eye are separately prepared is that a shape of a left eye and a shape of a right eye of a person are different and therefore drawn makeup parts for the left and right eyes are also different.

A reason why three pieces of data are stored in each of the makeup parts 208, 210, 212, and 214 in the table of FIG. 8 is that the eye makeup part includes the upper eyelid makeup part 90A, the eye upper edge makeup part 90B, and the lower eyelid makeup part 90C as described above. The number of pieces of data stored in the makeup parts 208, 210, 212, and 214 is not limited to three and may be any value.

In a case where data stored in the eye-opened makeup parts 208 and 210 is an "opened-eye drawn makeup part", data stored in the eye-closed makeup parts 212 and 214 in the same row (record) is a "closed-eye deformed makeup part".

Conversely, in a case where data stored in the eye-closed makeup parts 212 and 214 is a "closed-eye drawn makeup part", data stored in the eye-opened makeup parts 208 and 210 in the same row (record) is an "opened-eye deformed makeup part".

In the face image management table 50, positional information of feature points of left and right eyes of the user (not illustrated in FIG. 8) may be managed in association with the made-up user ID 202.

Method for Generating Deformed Makeup Part

Next, a method for generating a deformed makeup part is described.

Figure 9:
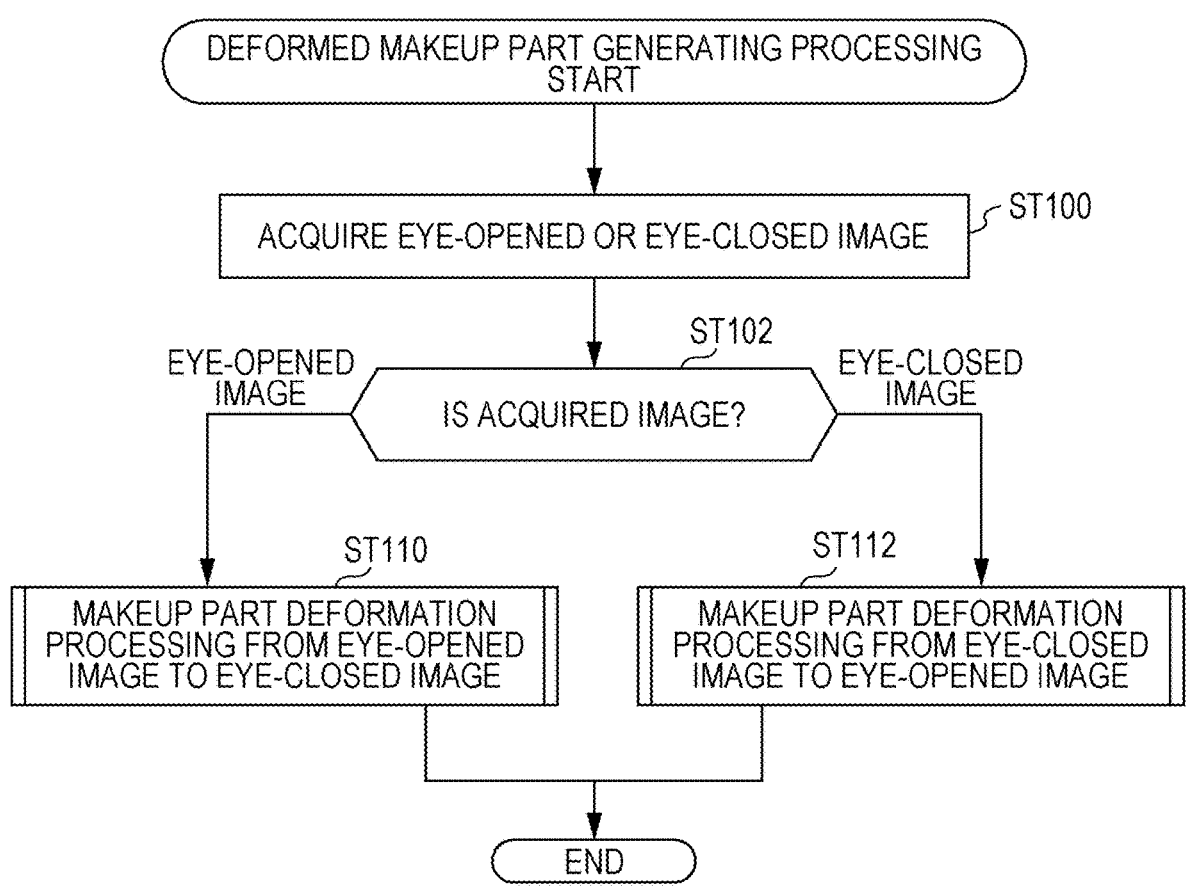
FIG. 9 is a flowchart illustrating processing for generating a deformed makeup part.

FIG. 9 is a flowchart illustrating processing for generating a deformed makeup part.

The face image acquisition unit 15 acquires a face image from the face image management table 50 (ST100).

Next, the makeup part deforming unit 30 determines whether the acquired face image is an eye-opened image or an eye-closed image (ST102).

In a case where it is determined that the acquired face image is an eye-opened image (eye-opened image in ST102), the makeup part deforming unit 30 executes processing for generating a deformed makeup part for an eye-closed image from a drawn makeup part for the eye-opened image (ST110) and finishes this processing. Details of the processing will be described later (see FIG. 10).

In a case where it is determined that the acquired face image is an eye-closed image (eye-closed image in ST102), the makeup part deforming unit 30 executes processing for generating a deformed makeup part for an eye-opened image from a drawn makeup part for the eye-closed image (ST112) and finishes this processing. Details of the processing will be described later (see FIG. 11).

Figure 10:
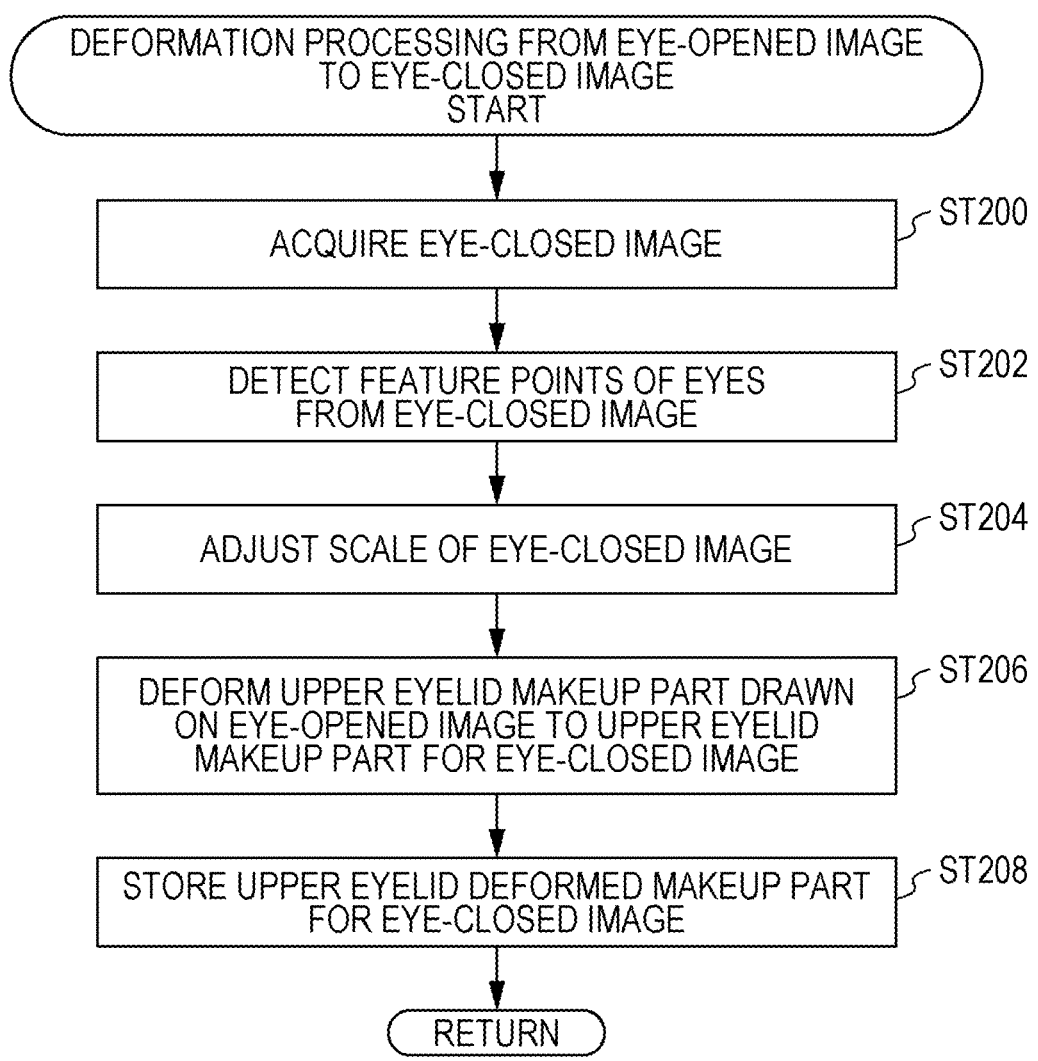
FIG. 10 is a flowchart illustrating processing for generating a deformed makeup part for an eye-closed image from a drawn makeup part for an eye-opened image.

FIG. 10 is a flowchart illustrating processing for generating a deformed makeup part for an eye-closed image from a drawn makeup part for an eye-opened image. This processing corresponds to ST110 of FIG. 9.

The face image acquisition unit 15 acquires an eye-closed image corresponding to the eye-opened image acquired in ST100 from the eye-closed image 206 of the face image management table 50 (ST200).

Next, the makeup part deforming unit 30 detects feature points of eyes from the eye-closed image (ST202).

Next, the makeup part deforming unit 30 adjusts a scale of the eye-closed image so that the eye-closed image matches the eye-opened image (ST204). For example, the makeup part deforming unit 30 enlarges or reduces the eye-closed image so that a horizontal width of eyes of the eye-closed image (a distance between the eye inner corner point 80A and the eye outer corner point 80B) becomes the same as a horizontal width of eyes of the eye-opened image. This is because a horizontal component of a makeup part is not deformed although a vertical component of the makeup part is deformed as described in FIGS. 5A and 5B.

Next, the makeup part deforming unit 30 acquires the upper eyelid makeup part 90A and the eye upper edge makeup part 90B from the eye-opened makeup parts 208 and 210 of the face image management table 50 and then generates the deformed makeup part 72 by warping lower chords of the makeup parts downward (ST206).

Next, the makeup part deforming unit 30 stores, in the eye-closed makeup parts 212 and 214 of the face image management table 50, the generated deformed makeup part 72 for the eye-closed image, i.e., the deformed upper eyelid makeup part and eye upper edge makeup part (ST208) and then returns to ST110 of FIG. 8.

Figure 11:
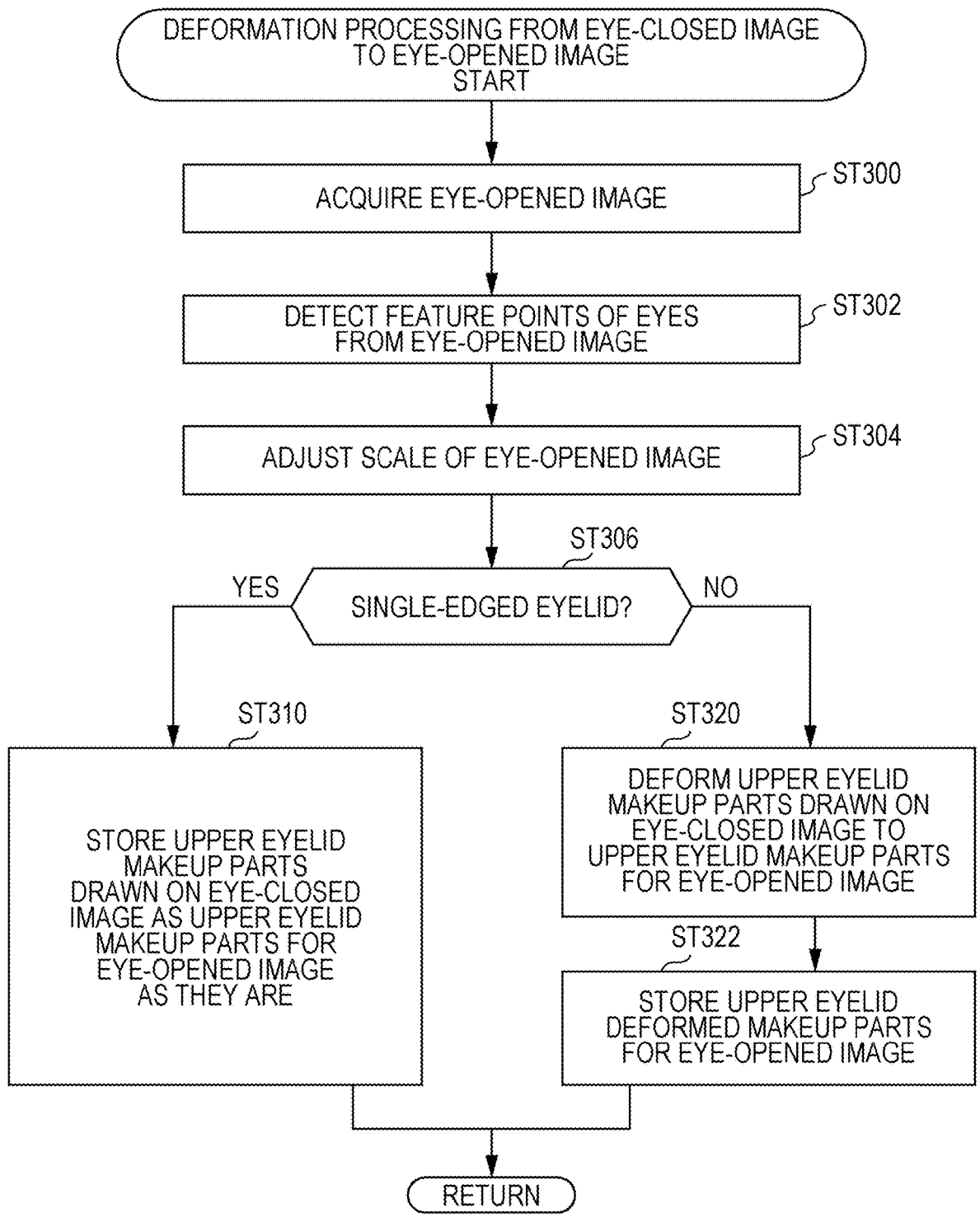
FIG. 11 is a flowchart illustrating processing for generating a deformed makeup part for an eye-opened image from a drawn makeup part for an eye-closed image.

FIG. 11 is a flowchart illustrating processing for generating a deformed makeup part for an eye-opened image from a drawn makeup part for an eye-closed image. This processing corresponds to ST112 of FIG. 9.

The face image acquisition unit 15 acquires an eye-opened image corresponding to the eye-closed image acquired in ST100 from the eye-opened image 204 of the face image management table 50 (ST300).

Next, the makeup part deforming unit 30 detects feature points of eyes from the eye-opened image (ST302).

Next, the makeup part deforming unit 30 adjusts a scale of the eye-opened image so that the eye-opened image matches the eye-closed image (ST304). For example, the makeup part deforming unit 30 enlarges or reduces the eye-opened image so that a horizontal width of eyes of the eye-opened image (a distance between the eye inner corner point 80A and the eye outer corner point 80B) becomes the same as a horizontal width of eyes of the eye-closed image.

Next, the makeup part deforming unit 30 determines whether or not the eyes of the face image are single-edged eyelids by referring to the single-edged eyelid flag 216 of the face image management table 50 (ST306).

In a case where the eyes of the face image are single-edged eyelids (YES in ST306), the makeup part deforming unit 30 acquires upper eyelid makeup parts from the eye-closed makeup parts 212 and 214 of the face image management table 50 and then stores the acquired upper eyelid makeup parts in the eye-opened makeup parts 208 and 210 of the face image management table 50 without deformation (as they are) (ST310), and then returns to ST112 of FIG. 8.

In a case where the eyes of the face image are double-edged eyelids (NO in ST306), the makeup part deforming unit 30 acquires upper eyelid makeup parts from the eye-closed makeup parts 212 and 214 of the face image management table 50 and then generates deformed makeup parts by warping lower chord parts of the makeup parts upward (ST320).

Then, the makeup part deforming unit 30 stores, in the eye-opened makeup parts 208 and 210 of the face image management table 50, the generated deformed makeup parts for the eye-opened image, i.e., the deformed upper eyelid makeup parts (ST322) and then returns to ST112 of FIG. 8.

Method for Displaying Deformed Makeup Part

Next, a method for displaying a deformed makeup part is described.

Figure 12:
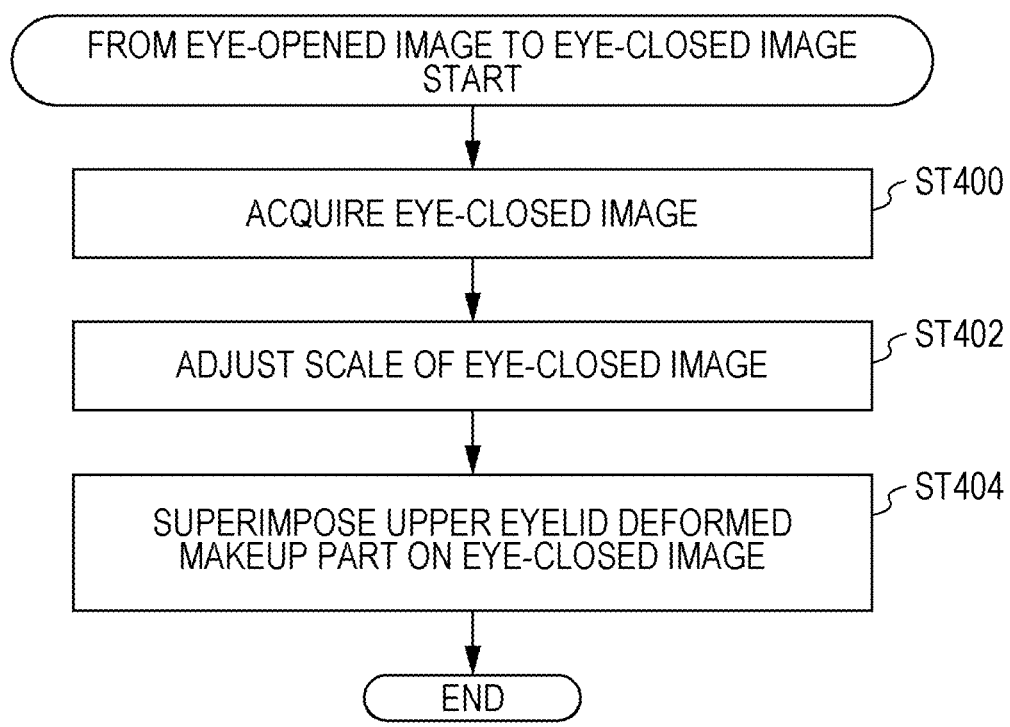
FIG. 12 is a flowchart illustrating processing for display switching from an eye-opened image to an eye-closed image.

FIG. 12 is a flowchart illustrating processing for display switching from an eye-opened image to an eye-closed image.

The makeup part superimposing unit 40 acquires an eye-closed image associated with an eye-opened image that is being displayed from the face image management table 50 (ST400).

Next, the makeup part superimposing unit 40 adjusts a scale of the eye-closed image as described with reference to FIG. 10 (ST402).

Next, the makeup part superimposing unit 40 generates a display image by acquiring a deformed makeup part for an upper eyelid, a deformed makeup part for an eye upper edge, and a drawn makeup part for a lower eyelid from the eye-closed makeup parts 212 and 214 of the face image management table 50 and then superimposing these makeup parts onto the eye-closed image (ST404) and then finishes this processing. This display image is displayed by a predetermined display device.

Figure 13:
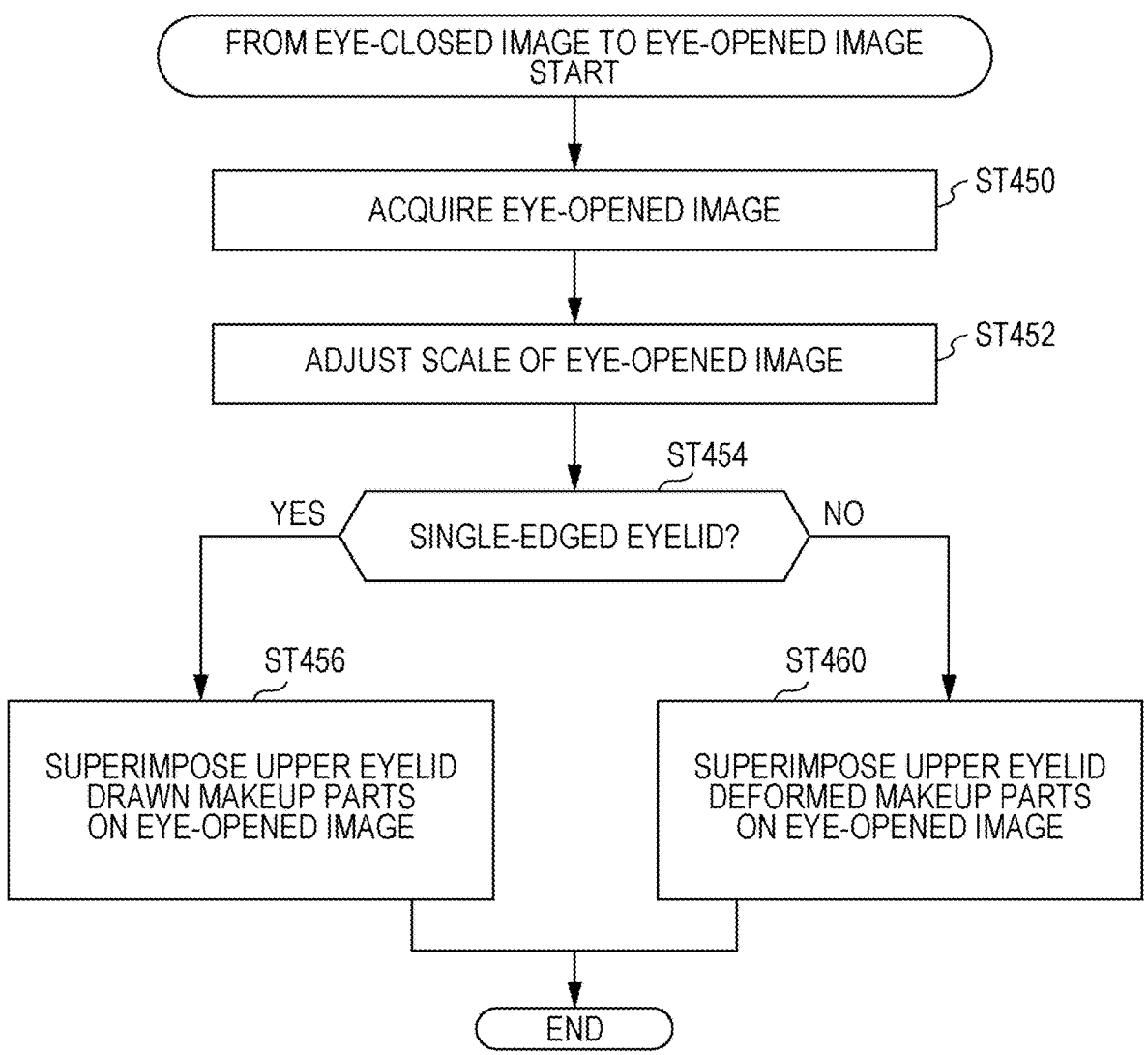
FIG. 13 is a flowchart illustrating processing for display switching from an eye-closed image to an eye-opened image.

FIG. 13 is a flowchart illustrating processing for display switching from an eye-closed image to an eye-opened image.

The makeup part superimposing unit 40 acquires an eye-opened image associated with an eye-closed image that is being displayed from the face image management table 50 (ST450).

Next, the makeup part superimposing unit 40 adjusts a scale of the eye-opened image as described with reference to FIG. 10 (ST452).

Next, the makeup part superimposing unit 40 determines whether or not eyes in the face image are single-edged eyelids by referring to the single-edged eyelid flag 216 of the face image management table 50 (ST454).

In a case where the eyes in the face image are single-edged eyelids (YES in ST454), the makeup part superimposing unit 40 generates a display image by acquiring a drawn makeup part (i.e., a makeup part that has not been deformed) for an upper eyelid, a drawn makeup part for an eye upper edge, and a drawn makeup part for a lower eyelid from the eye-opened makeup parts 208 and 210 of the face image management table 50 and then superimposing these makeup parts onto the eye-opened image (ST456) and then finishes this processing. This display image is displayed by a predetermined display device.

In a case where the eyes in the face image are double-edged eyelids (NO in ST454), the makeup part superimposing unit 40 generates a display image by acquiring a deformed makeup part for an upper eyelid, a deformed makeup part for an eye upper edge, and a drawn makeup part for a lower eyelid from the eye-opened makeup parts 208 and 210 of the face image management table 50 and then superimposing these makeup parts onto the eye-opened image (ST460) and then finishes this processing. This display image is displayed by a predetermined display device.

In the above description, an example of deformation using FIGS. 3 through 6 has been described as a method for deforming the upper eyelid makeup part 90A when eyes are opened and closed. However, deformation described below may be further added.

Figure 18A:
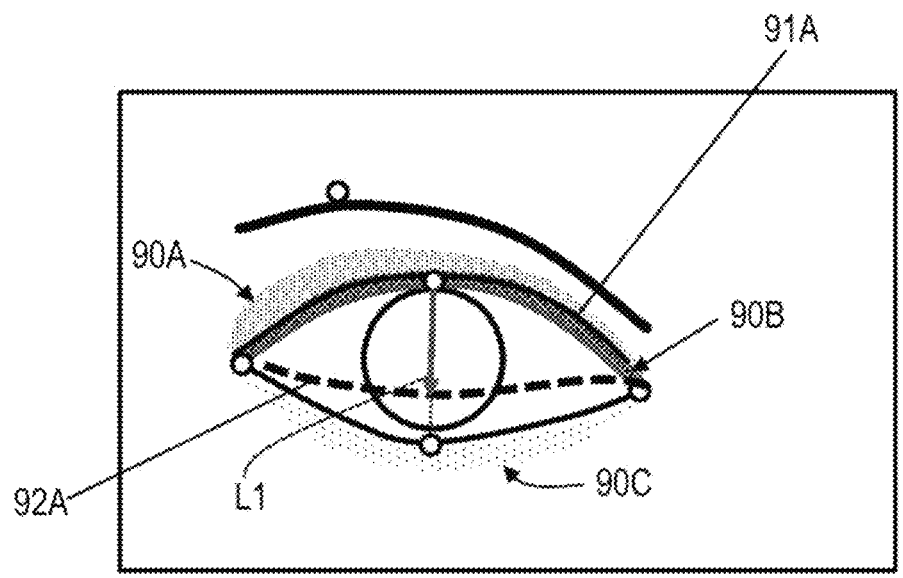
FIG. 18A is a schematic view of an eye-opened image.
Figure 18B:
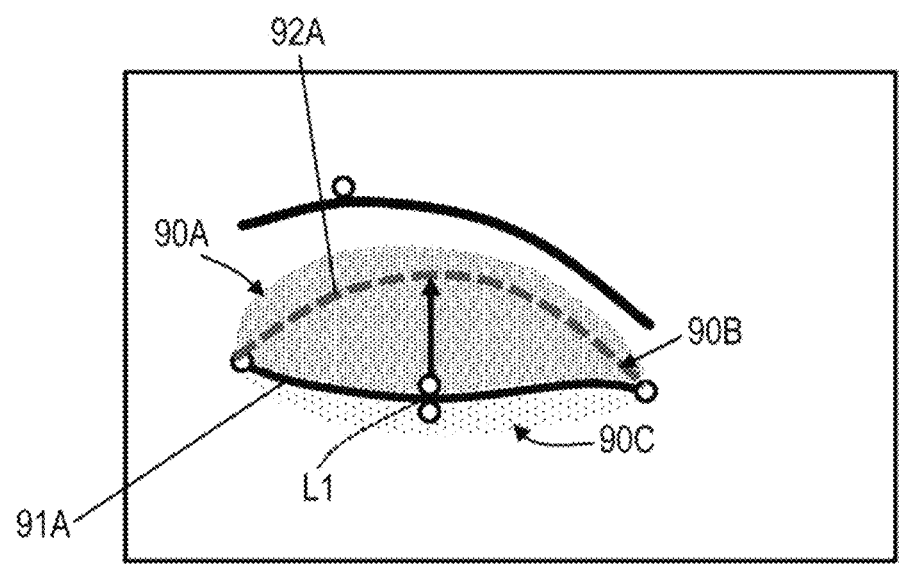
FIG. 18B is a schematic view of an eye-closed image.

FIG. 18A is a schematic view of an eye-opened image. FIG. 18B is a schematic view of an eye-closed image. In FIG. 18A, arc lines on eyes illustrated in FIGS. 3(*a*) and 4(*a*) are detected by using the three feature points 80A, 80B, and 80C in FIGS. 2A through 2D. A makeup part is deformed as follows when the eye-opened image of FIG. 18A shifts to an eye-closed image. A drawn range of the upper eyelid makeup part 90A is expanded from a lower chord line 91A of the upper eyelid makeup part 90A drawn on the eye-opened image to a position of an arc line 92A on the eyes in the eye-closed image.

Figure 19:
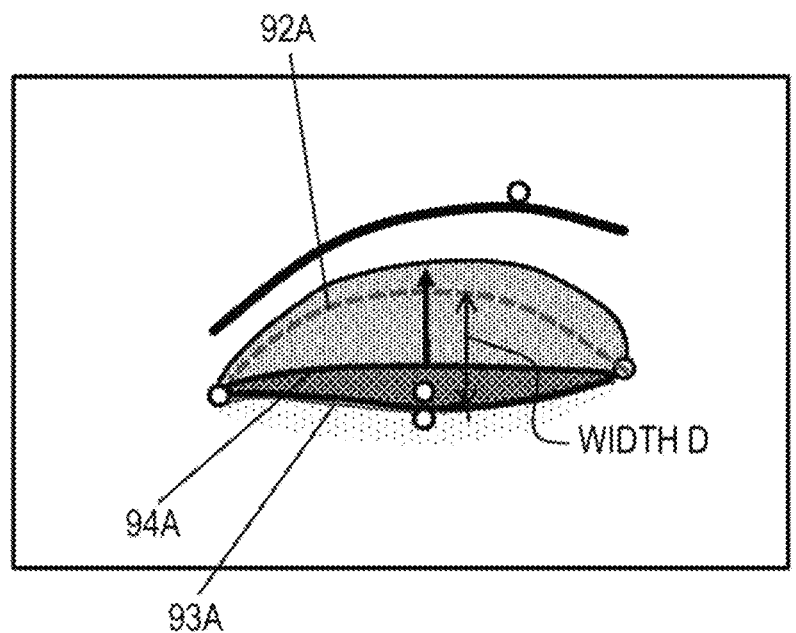
FIG. 19 is a schematic view of a case where an eye-closed image including a double double-edged eyelid width makeup part shifts to an eye-opened image.

Conversely, a makeup part is deformed as follows when the eye-closed image of FIG. 18B shifts to an eye-opened image. A drawn range of the upper eyelid makeup part 90A is reduced from a lower chord line 91A of the upper eyelid makeup part 90A drawn on the eye-closed image to a position of the arc line 92A on the eyes in the eye-opened image. FIG. 19 is a schematic view of a case where an eye-closed image including a double-edged eyelid width makeup part shifts to an eye-opened image. As illustrated in FIG. 19, a drawn range of the makeup part 90A is expanded upward by a width D (a distance in an up-down direction between a lower chord line 93A of the upper makeup part and the arc line 92A on the eyes in the eye-opened image).

Figure 20:
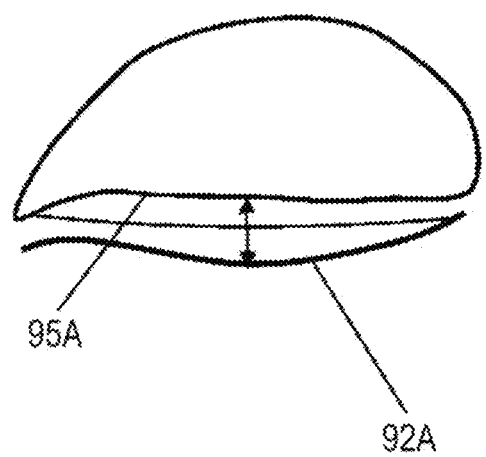
FIG. 20 illustrates a method for detecting a triple-edged eyelid line in an eye-closed image.

Furthermore, an amount of deformation of an eye makeup part in a case of a double-edged eyelid and an amount of deformation of an eye makeup part in a case of a triple-edged eyelid may be different from each other. First, for example, it is determined that eyes have triple-edged eyelids in a case where a line is detected between the arc line 92A on the eyes and a double-edged-eyelid line 95A in the eye-closed image illustrated in FIG. 20. In a case where this line is not detected, it is determined that the eyes have double-edged eyelids. In the case of triple-edged eyelids, a drawn part is hidden by being folded into a line (crease) when the eyes are opened. In view of this, an amount of upward enlargement of a drawn range of the makeup part 90A is made larger (e.g., 1.1 times larger) than the case of double-edged eyelids.

Drawing of Makeup Part

Figure 14:
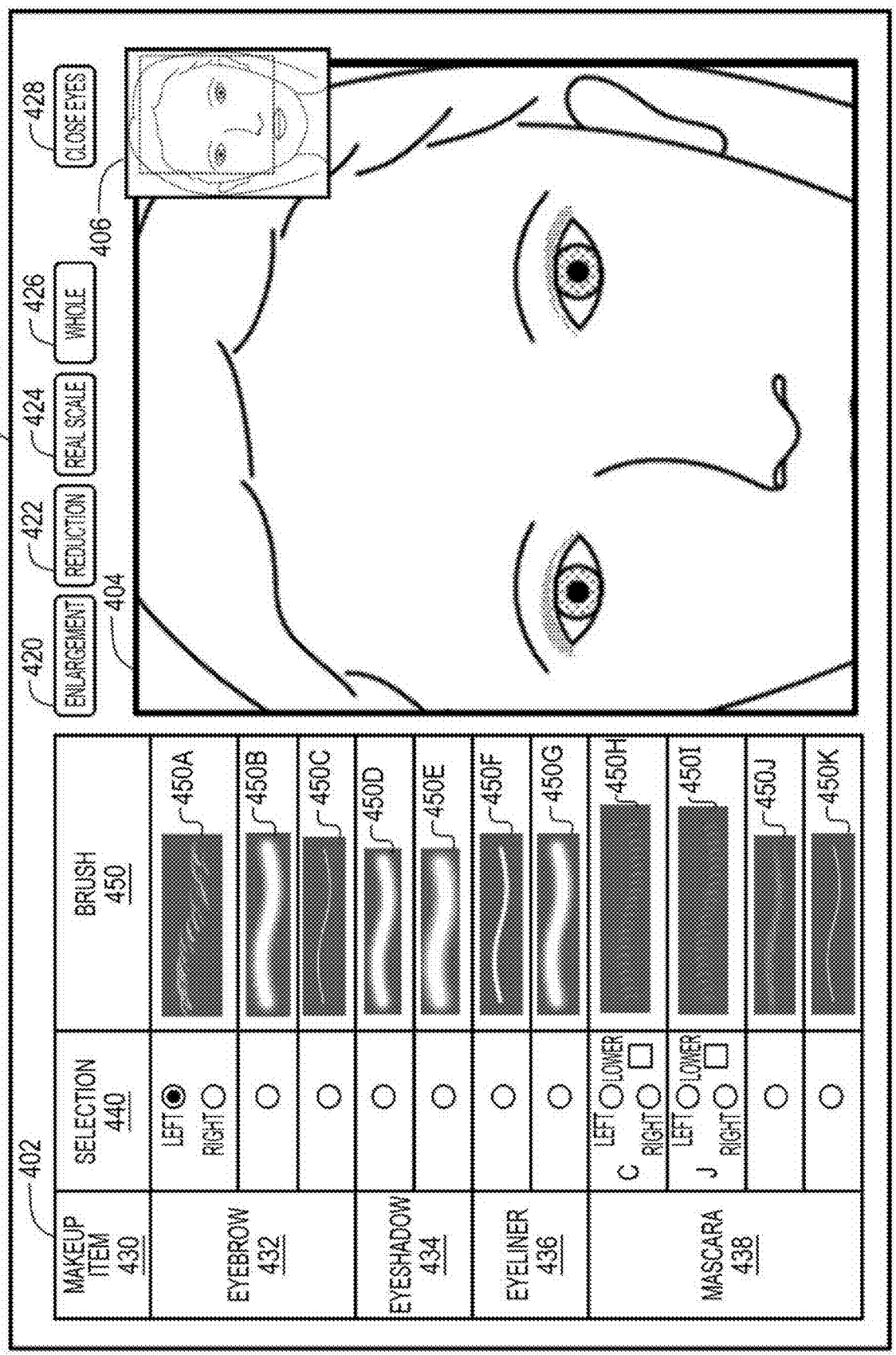
FIG. 14 is a schematic view illustrating a makeup part drawing screen.

FIG. 14 is a schematic view illustrating a makeup part drawing screen.

A makeup part drawing screen 400 is, for example, generated by the makeup part drawing unit 20 and is, for example, displayed on a display device such as a liquid crystal display or a tablet screen that supports a touch pen.

The makeup part drawing screen 400 has a makeup item selection region 402, a makeup part drawing region 404, and a preview image display region 406. The makeup part drawing screen 400 has an enlargement button 420, a reduction button 422, a real scale button 424, a whole button 426, and an eye opening closing switching button 428.

Various makeup items 430 for drawing a makeup part on a face image are displayed in the makeup item selection region 402.

The makeup items 430 include, for example, an eyebrow 432, an eye shadow 434, an eyeliner 436, and mascara 438.

With each of the makeup items 430, one or more brushes 450 for drawing the makeup item 430 are associated.

A brush 450A for drawing a plurality of hairs all at once is associated with the eyebrow 432. The brush 450A for a right eye and the brush 450A for a left eye are selectable. A flow of hairs of the brush 450A for a right eye and a flow of hairs of the brush 450A for a left eye are reverse to each other. A pen pressure of the brush 450A corresponds to a color density.

Furthermore, a brush 450B for blurring an eyebrow like powder is associated with the eyebrow 432. A pen pressure of the brush 450B corresponds to a color density.

Furthermore, a brush 450C for drawing eyebrow hairs one by one is associated with the eyebrow 432. A pen pressure of the brush 450C corresponds to a color density.

A normal brush 450D and a brush 450E whose pen pressure corresponds to a color density are associated with the eye shadow 434.

A brush 450F whose pen pressure corresponds to a color density and a brush 450G whose pen pressure corresponds to a line thickness are associated with the eyeliner 436.

Brushes 450H and 450I for drawing eyelashes along an eye shape are associated with the mascara 438. The brushes 450H and 450I for a right eye and the brushes 450H and 450I for a left eye are selectable. Furthermore, the brush 450H for drawing a C curve and the brush 450I for drawing a J curve are selectable. Details of the C curve and the J curve will be described later (see FIGS. 15A and 15B). A pen pressure of the brushes 450H and 450I corresponds to a mascara size. That is, a size of drawn mascara is large in a case where the pen pressure is large, and a size of drawn mascara is small in a case where the pen pressure is small. Furthermore, the brushes 450H and 450I can be switched between the brushes 450H and 450I for upper eyelashes and the brushes 450H and 450I for lower eyelashes. A flow of eyelashes of the brushes 450H and 450I for upper eyelashes and a flow of eyelashes of the brushes 450H and 450I for lower eyelashes are reverse to each other.

Furthermore, a brush 450J for drawing a plurality of eyelashes all at once is associated with the mascara 438.

Furthermore, a brush 450K for drawing eyelashes one by one is associated with the mascara 438. A pen pressure of this brush corresponds to a color density.

The makeup execution user draws makeup on a face image displayed in the makeup part drawing region 404 by selecting any one of these brushes 450 by using the selection button 440. The drawn makeup is a drawn makeup part.

When the enlargement button 420 is pressed, a face image displayed in the makeup part drawing region 404 is enlarged.

When the reduction button 422 is pressed, a face image displayed in the makeup part drawing region 404 is reduced.

When the real scale button 424 is pressed, a face image of a real scale is displayed in the makeup part drawing region 404. This allows the makeup execution user to draw a makeup part as if the makeup execution user applies makeup to an actual face. Furthermore, it is possible to know in a more real way how a made-up face appears when the face is viewed up close.

When the whole button 426 is pressed, a whole face image is displayed in the makeup part drawing region 404. This makes it possible to know in a more real way how a made-up face appears when the face is viewed from a long distance.

When the eye opening and closing switching button 428 is pressed, display is switched to an eye-closed image and the deformed makeup part 72 in a case where an eye-opened image and the drawn makeup part 70 are being displayed in the makeup part drawing region 404. Conversely, in a case where the eye-closed image and the drawn makeup part 70 are being displayed in the makeup part drawing region 404, display is switched to the eye-opened image and the deformed makeup part 72. This makes it possible to easily know how makeup appears when eyes are closed and when the eyes are closed.

For example, on the makeup part drawing screen of FIG. 14, in a case where a brush for a right eye and a brush for a left eye are prepared as in the case of the eyebrow 432 and mascara 438, the brushes may be switched by using a button of a touch pen instead of left and right selection buttons on a GUI. For example, a brush for a right eye is selected in a default state, but a brush for a left eye is selected for drawing while the button of the touch pen is being pressed.

In the preview image display region 406, a whole face image is displayed and a position of the face image displayed in the makeup part drawing region 404 in the whole face image is displayed. When the real scale button 424 is pressed, the face image in the preview image display region 406 may be displayed in a real scale.

Figure 15A:
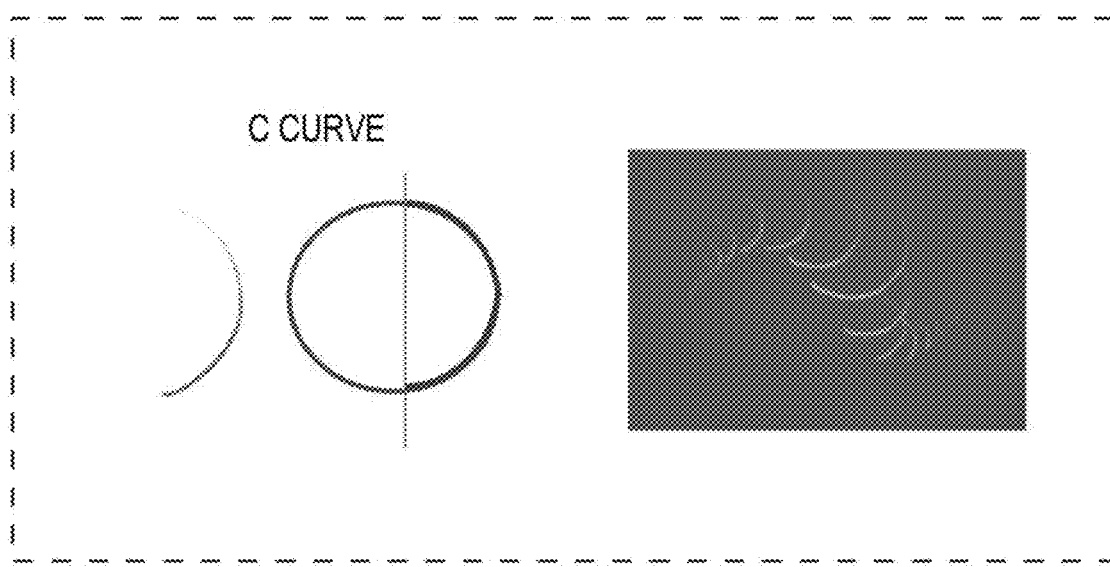
FIG. 15A is a schematic view illustrating a C curve of mascara.
Figure 15B:
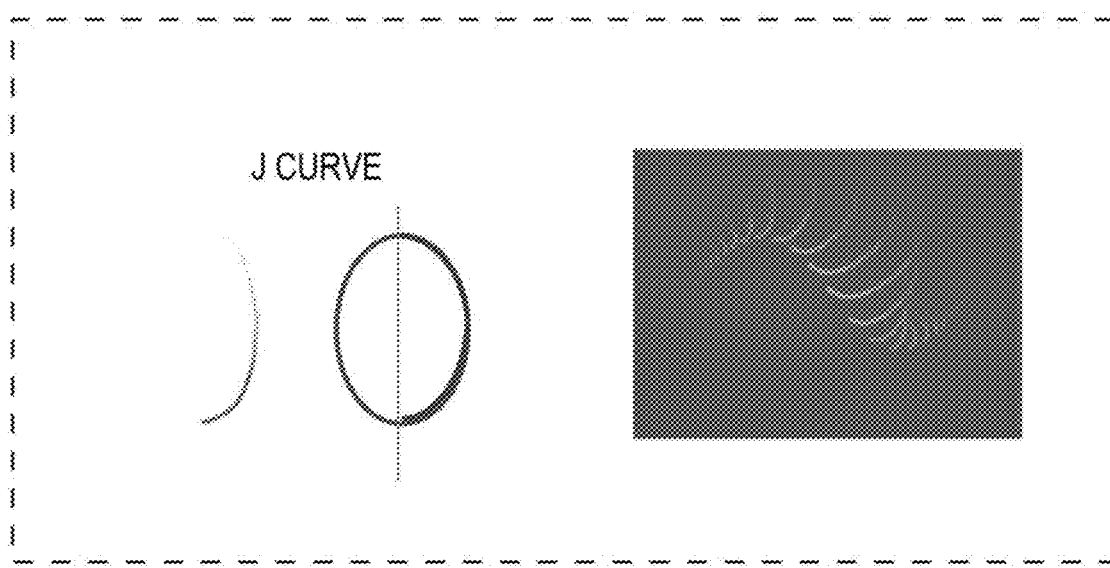
FIG. 15B is a schematic view illustrating a J curve of mascara.

FIG. 15A is a schematic view illustrating a C curve of mascara, and FIG. 15B is a schematic view illustrating a J curve of mascara.

When a brush for a C curve associated with the mascara 438 is moved from an inner corner to an outer corner of an eye, a curve shape like a semi-circle arc is successively drawn as illustrated in FIG. 15A. This allows the makeup execution user to easily draw a C-curve eyelash extension on a face image.

When a brush for a J curve associated with the mascara 438 is moved from an inner corner to an outer corner of an eye, a curve shape like a semi-ellipse arc is successively drawn as illustrated in FIG. 15B. This allows the makeup execution user to easily draw a J-curve eyelash extension on a face image.

Figure 16:
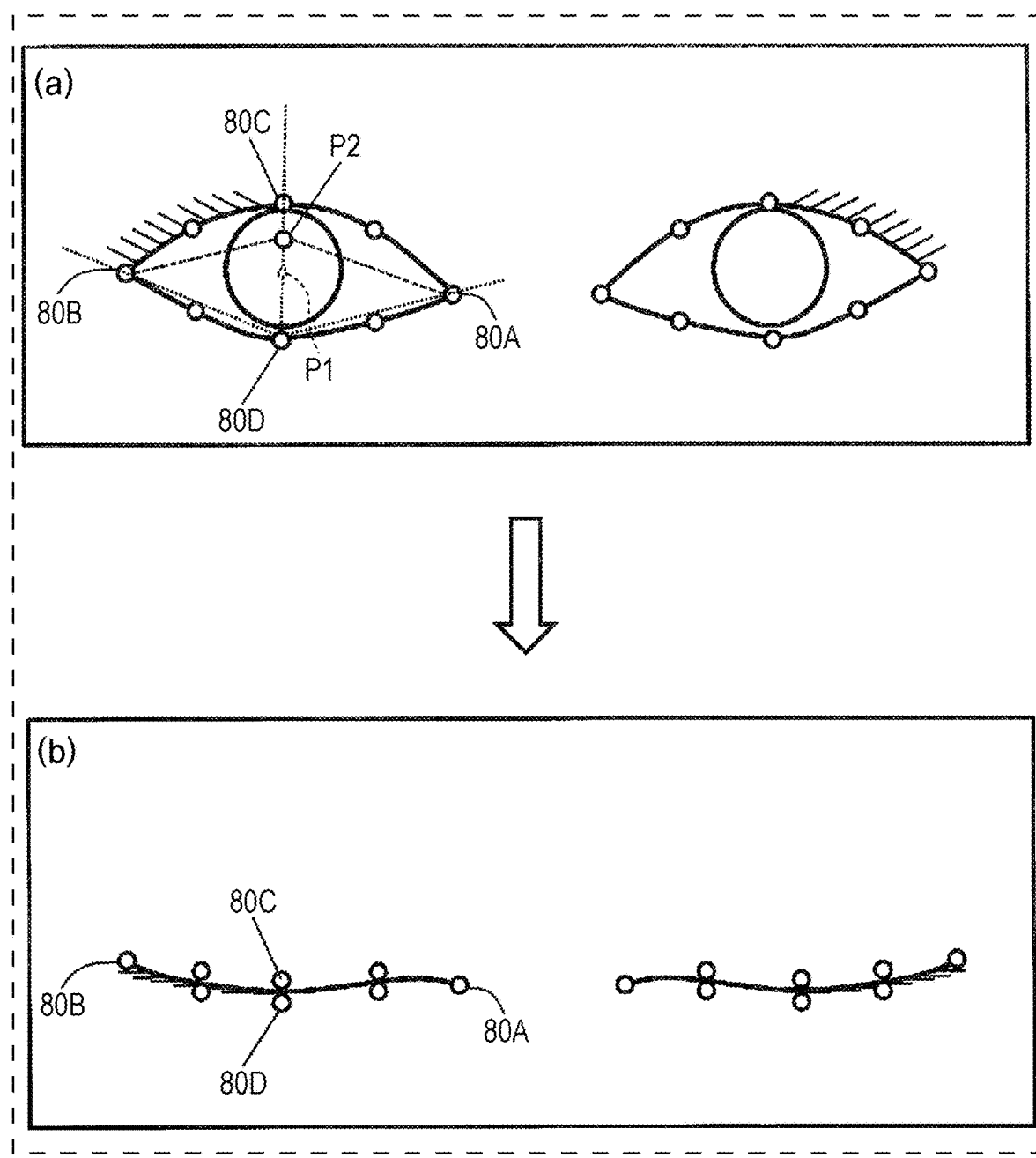
FIG. 16 is a schematic view illustrating how a mascara part is deformed by opening and closing of eyes.

FIG. 16 is a schematic view illustrating how a mascara part is deformed when eyes are opened and closed.

A deformed makeup part for a mascara part can be also generated as in the case of an upper eyelid makeup part.

In a case where a mascara part like the one illustrated in FIG. 16(*a*) is drawn on an eye-opened image, the makeup part deforming unit 30 generates a mascara part for an eye-closed image like the one illustrated in FIG. 16(*b*) by deforming the mascara part.

The makeup part deforming unit 30 may deform the mascara part by using the eye inner corner point 80A, the eye outer corner point 80B, and a point located between the iris upper point 80C and the iris lower point 80D so that the mascara part lies down in a natural way (along a face surface) in the eye-closed image, in other words, so that behavior of the mascara part becomes the same as typical behavior of eyelashes in an eye-closed state.

For example, as illustrated in FIG. 16(*a*), the makeup part deforming unit 30 specifies a midpoint P1 of a segment connecting the iris upper point 80C and the iris lower point 80D and then further specifies a midpoint P2 of a segment connecting the middle point P1 and the iris upper point 80C. Then, the makeup part deforming unit 30 deforms the mascara part drawn on the eye-opened image by using the eye inner corner point 80A, the specified midpoint P2, and the eye outer corner point 80B.

Hardware Configuration

Although the exemplary embodiment according to the present disclosure has been described above in detail, the functions of the device 10 can be realized by a computer program.

FIG. 17 illustrates a hardware configuration of a computer that realizes functions of each device by using a program. This computer 1100 includes an input device 1101 such as a keyboard, a mouse, or a touch pad, an output device 1102 such as a display or a speaker, a central processing unit (CPU) 1103, a read only memory (ROM) 1104, a random access memory (RAM) 1105, a storage device 1106 such as a hard disk device or a solid state drive (SSD), a reading device 1107 that reads information from a recording medium such as a digital versatile disk read only memory (DVD-ROM) or a universal serial bus (USB) memory, and a network card 1108 that performs communication over a network, which are connected to one another through a bus 1109.

The reading device 1107 reads a program for realizing functions of each device from a recording medium on which the program is recorded and causes the program to be stored in the storage device 1106. Alternatively, the network card 1108 communicates with a server device connected to the network and causes the program for realizing the functions of each device downloaded from the server device to be stored in the storage device 1106.

Then, the CPU 1103 copies the program stored in the storage device 1106 into the RAM 1105, sequentially reads out a command included in the program from the RAM 1105 and executes the command, and thus realizes the functions of each device.

The above exemplary embodiment is illustration for description of the present disclosure and does not intend to limit the scope of the present disclosure to the exemplary embodiment. A person skilled in the art can modify the present disclosure in other various manners without departing from the spirit of the present disclosure.

The present disclosure is useful as a makeup simulation device and a makeup simulation method that can properly simulate makeup.

What is claimed is:

1. A makeup simulation device that superimposes an eye makeup part onto a face image obtained by photographing a face of a subject and causes the face image to be displayed on a display device, the makeup simulation device comprising a processor comprising:
    a face image acquirer that acquires a first face image and a second face image that are different from each other in appearance of the face due to movement of a specific face part;
    a makeup part deforming unit that generates a deformed makeup part by deforming an eye makeup part drawn on the specific face part in the first face image with left and right electronic mascara brushes by a makeup execution person in accordance with movement of the specific face part;
    a makeup part superimposing unit that superimposes the makeup part and the deformed eye makeup part onto face images including the second face image of the subject, respectively;
    a memory storing the left and right electronic mascara brushes for drawing a mascara line on the upper lid of left and right open eye images, respectively; and
    the display device supporting a touch pen and displaying a makeup part drawing screen displaying the first face image and the second face image, and
    a makeup item selection region displaying the left and right electronic mascara brushes stored in the memory, wherein
    in a case where the first face image is a face image showing closed eyes comprising an eye-closed image, and where the second face image is a face image showing opened eyes comprising an eye-opened image, the makeup part deforming unit deforms the eye makeup part for an upper eyelid drawn on a face part of the closed eyes by a makeup execution person to an eye makeup part for a face part of the opened eyes by stretching a lower chord part of the eye makeup part for the upper eyelid upward, and by removing, from the eye makeup part, a part of the eye makeup part that overlaps a region of the opened eyes in a case where the eye makeup part is superimposed on the face image showing the opened eyes as it is,
    in a case where the first face image is an eye-opened image and the second face image is an eye-closed image,
        the makeup execution person draws a mascara line on a left eye-opened image with the left electronic mascara brush and draws a mascara line on a right-opened image with the right electronic mascara brush, and
        the makeup part deforming unit deforms the mascara line drawn on the left eye-opened image and applies the deformed mascara line to the left eye-closed image, and deforms the mascara line drawn on the right eye-opened image and applies the deformed mascara line to the right eye-closed image using
            eye inner corner points of the left and right eye images, respectively,
            eye outer corner points of the left and right eye images, respectively, and
            a point located between an iris upper point and an iris lower point of the left and right eye images, respectively,
            so that the mascara line lies down along a face surface of the left and right eye-closed images, to mimic the typical behavior of eyelashes in an eye-closed state, and
    the makeup part deforming unit adjusts the scale of the eye-closed image to match the scale of the eye-opened image.

2. The makeup simulation device according to claim 1, wherein
    in a case where the first face image is a face image showing opened eyes and the second face image is a face image showing closed eyes, the makeup part deforming unit deforms the eye makeup part drawn on a face part of the opened eyes by a makeup execution person to an eye makeup part for a face part of the closed eyes by stretching a lower chord part of the eye makeup part downward.

3. The makeup simulation device according to claim 1, wherein
    in a case where the first face image is a face image showing closed eyes and where the second face image is a face image showing opened eyes, the makeup part deforming unit deforms the eye makeup part drawn on a face part of the closed eyes by a makeup execution person to an eye makeup part for a face part of the opened eyes by enlarging a vertical component of the eye makeup part drawn on the face part of the closed eye upward on a whole.

4. The makeup simulation device according to claim 1, wherein the eye makeup part includes a makeup part for an upper eyelid, a makeup part for an eye upper edge, and a makeup part for a lower eyelid.

5. The makeup simulation device according to claim 4, wherein
in a case where the first face image is a face image showing closed eyes and the second face image is a face image is a face image showing opened eyes and where eyelids in the first and second face images are single-edged eyelids or partially-creased eyelids, the makeup part superimposing unit superimposes the makeup part for the upper eyelid displayed on the first face image onto the second face image without deforming the makeup part for the upper eyelid.

6. The makeup simulation device according to claim 1, wherein the makeup part deforming unit enlarges or reduces the eye-closed image so that a horizontal width of eyes of the eye-closed image, comprising a distance between an eye inner corner point and an eye outer corner point, becomes the same as a horizontal width of eyes of the eye-opened image.

7. The makeup simulation device according to claim 1, wherein the face image acquirer also displays the first face image and the second face image on the display device, the display device accepting drawing of an eye makeup part by a makeup execution person on the specific face part in the first face image, the display device displaying the makeup part drawing screen having
a makeup part drawing region displaying the first face image on which the makeup execution person draws the eye makeup part with the selected brush,
an enlargement button, which when selected, enlarges the displayed first face image,
a reduction button, which when selected, reduces the displayed first face image,
a real scale button, which when selected displays the first face image in real scale,
a whole button, which when selected displays a whole image of the first face image, and
an eye opening closing switching button, which when the first face image is displayed showing closed eyes and when the eye opening closing switching button is then selected, the second face image showing open eyes is displayed, and when the second face image is displayed showing open eyes and when the eye opening closing switching button is then selected, the first face image showing closed eyes is displayed.

8. The makeup simulation device according to claim 1, wherein
the makeup item selection region also includes
a selectable J mascara brush for drawing a J curve on the upper eyelid of an open eye image of one of the first face image and the second face image, and
a selectable C mascara brush for drawing a C curve on the upper eyelid of an open eye image of one of the first face image and the second face image,
in the case where the first face image is an eye-opened image and the second face image is an eye-closed image,
one of the selectable J mascara brush and the selectable C mascara brush is usable by the makeup execution person to draws a mascara line on the upper eyelid of the eye-opened image, and
the makeup part deforming unit deforms the mascara line applied to the eye-opened image with a selected one of the selectable J mascara brush and the selectable C mascara brush, and applies the deformed mascara line to the eye-closed image.

9. The makeup simulation device according to claim 1, wherein
the memory also stores first and second electronic mascara brushes different from the left and right electronic mascara brushes, the first brush for drawing a plurality of eyelashes all at once, and the second brush for drawing eyelashes one by one;
the makeup item selection region displays the first and second electronic mascara brushes stored in the memory,
in the case where the first face image is an eye-opened image and the second face image is an eye-closed image,
the first and second electronic mascara brushes are usable by the makeup execution person to draw on the upper eyelid of the eye-opened image, and
the makeup part deforming unit
deforms the plurality of eyelashes drawn all at once by the first electronic mascara brush on the eye-opened image and applies the deformed plurality of eyelashes to the eye-closed image when the first electronic mascara brush is used on the eye-closed image, and
deforms an eye lash or lashes drawn one at a time by the second electronic mascara brush on the eye-opened image and applies the deformed eye lash or lashes to the eye-closed image on the eye-closed image when the second electronic mascara brush is used.

10. The makeup simulation device according to claim 1, wherein
the makeup part deforming unit determines whether or not the eyes of the first and second face images are single-edged eyelids or double-edged eyelids by referring to a single-edged eyelid flag of a face image management table,
in a case where the eyes of the first and second face images are determined to be single-edged eyelids, the makeup part deforming unit acquires upper eyelid makeup parts from eye-closed makeup parts of the face image management table and then stores the acquired upper eyelid makeup parts in the eye-opened makeup parts of the face image management table without deformation, and
in a case where the eyes of the first and second face image are determined to be double-edged eyelids, the makeup part deforming unit acquires upper eyelid makeup parts from eye-closed makeup parts of the face image management table and then generates deformed makeup parts by warping lower chord parts of the makeup parts upward, and stores, in the eye-opened makeup parts of the face image management table, the generated deformed makeup parts for the eye-opened image.

11. A makeup simulation method for superimposing an eye makeup part onto a face image obtained by photographing a face of a subject and causing the face image to be displayed on a display device, the makeup simulation method comprising:
acquiring a first face image and a second face image that are different from each other in appearance of the face due to movement of a specific face part and generating a deformed makeup part by deforming an eye makeup part drawn on the specific face part in the first face image with left and right electronic mascara brushes by a makeup execution person in accordance with movement of the specific face part;

superimposing the makeup part and the deformed makeup part onto face images including the second face image of the subject, respectively;

storing in a memory the left and right electronic mascara brushes for drawing a mascara line on the upper lid of left and right open eye images, respectively;

displaying on the display device a makeup part drawing screen displaying the first face image and the second face image, displaying on the display device a makeup item selection region displaying the stored left and right electronic mascara brushes, in a case where the first face image is a face image showing closed eyes comprising an eye-closed image, and where the second face image is a face image showing opened eyes comprising an eye-opened image, the makeup part deforming operation deforms the eye makeup part for an upper eyelid drawn on a face part of the closed eyes by a makeup execution person to an eye makeup part for a face part of the opened eyes by stretching a lower chord part of the eye makeup part for the upper eyelid upward, and by removing, from the eye makeup part, a part of the eye makeup part that overlaps a region of the opened eyes in a case where the eye makeup part is superimposed on the face image showing the opened eyes as it is; and switching a displayed face image between a face image on which the makeup part is superimposed and a face image on which the deformed makeup part is superimposed, in a case where the first face image is an eye-opened image and the second face image is an eye-closed image, the left electronic mascara brush is used by the makeup execution person to draw a mascara line on a left eye-opened image and the right electronic mascara brush is used by the makeup execution person to draw a mascara line on a right-opened image, and the makeup part deforming unit deforms the mascara line drawn on the left eye-opened image and applies the deformed mascara line to the left eye-closed image, and deforms the mascara line drawn on the right eye-opened image and applies the deformed mascara line to the right eye-closed image using eye inner corner points of the left and right eye images, respectively, eye outer corner points of the left and right eye images, respectively, and a point located between an iris upper point and an iris lower point of the left and right eye images, respectively, so that the mascara line lies down along a face surface of the left and right eye-closed images, to mimic the typical behavior of eyelashes in an eye-closed state, and wherein the makeup part deforming operation adjusts the scale of the eye-closed image to match the scale of the eye-opened image.

12. The makeup simulation method according to claim 11, wherein the makeup part deforming operation enlarges or reduces the eye-closed image so that a horizontal width of eyes of the eye-closed image, comprising a distance between an eye inner corner point and an eye outer corner point, becomes the same as a horizontal width of eyes of the eye-opened image.

13. A non-transitory computer-readable recording medium storing a makeup simulation program for superimposing a makeup part onto a face image obtained by photographing a face of a subject and causing the face image to be displayed on a display device, the makeup simulation program causing a computer to execute processing comprising:

acquiring a first face image and a second face image that are different from each other in appearance of the face due to movement of a specific face part and generating a deformed makeup part by deforming an eye makeup part drawn on the specific face part in the first face image with left and right electronic mascara brushes by a makeup execution person in accordance with movement of the specific face part;

superimposing the makeup part and the deformed makeup part onto face images including the second face image of the subject, respectively;

storing in a memory the left and right electronic mascara brushes for drawing a mascara line on the upper lid of left and right open eye images, respectively;

displaying on the display device a makeup part drawing screen displaying the first face image and the second face image;

displaying on the display device a makeup item selection region displaying the stored left and right electronic mascara brushes;

in a case where the first face image is a face image showing closed eyes comprising an eye-closed image, and where the second face image is a face image showing opened eyes comprising an eye-opened image, the makeup part deforming operation deforms the eye makeup part for an upper eyelid drawn on a face part of the closed eyes by a makeup execution person to an eye makeup part for a face part of the opened eyes by stretching a lower chord part of the eye makeup part for the upper eyelid upward, and by removing, from the eye makeup part, a part of the eye makeup part that overlaps a region of the opened eyes in a case where the eye makeup part is superimposed on the face image showing the opened eyes as it is; and switching a displayed face image between a face image on which the makeup part is superimposed and a face image on which the deformed makeup part is superimposed, in a case where the first face image is an eye-opened image and the second face image is an eye-closed image, the left electronic mascara brush is used by the makeup execution person to draw a mascara line on a left eye-opened image and the right electronic mascara brush is used by the makeup execution person to draw a mascara line on a right-opened image, and the makeup part deforming unit deforms the mascara line drawn on the left eye-opened image and applies the deformed mascara line to the left eye-closed image, and deforms the mascara line drawn on the right eye-opened image and applies the deformed mascara line to the right eye-closed image using eye inner corner points of the left and right eye images, respectively, eye outer corner points of the left and right eye images, respectively, and a point located between an iris upper point and an iris lower point of the left and right eye images, respectively, so that the mascara line lies down along a face surface of the left and right eye-closed images, to mimic the typical behavior of eyelashes in an eye-closed state, and wherein the makeup part deforming operation adjusts the scale of the eye-closed image to match the scale of the eye-opened image.

14. The non-transitory computer-readable recording medium according to claim 13, wherein the makeup part deforming operation enlarges or reduces the eye-closed image so that a horizontal width of eyes of the eye-closed image, comprising a distance between an eye inner corner point and an eye outer corner point, becomes the same as a horizontal width of eyes of the eye-opened image.

* * * * *